US006921337B1

(12) United States Patent
Kennedy et al.

(10) Patent No.: US 6,921,337 B1
(45) Date of Patent: Jul. 26, 2005

(54) VIDEO GAMING DEVICE AND COMMUNICATIONS SYSTEM

(75) Inventors: Julian J. Kennedy, North Myrtle Beach, NC (US); Michael A. Morris, Huntsville, AL (US); Douglas E. Morris, Huntsville, AL (US)

(73) Assignee: Vegas Amusement Inc., Mountain Rest, SC (US)

( * ) Notice: Subject to any disclaimer, the term of this patent is extended or adjusted under 35 U.S.C. 154(b) by 0 days.

(21) Appl. No.: 09/787,103

(22) PCT Filed: Sep. 14, 1999

(86) PCT No.: PCT/ZA99/00085

§ 371 (c)(1),
(2), (4) Date: Jun. 7, 2001

(87) PCT Pub. No.: WO00/16273

PCT Pub. Date: Mar. 23, 2000

(Under 37 CFR 1.47)

Related U.S. Application Data

(60) Provisional application No. 60/100,499, filed on Sep. 14, 1998.

(51) Int. Cl.[7] ................................................ A63F 13/00
(52) U.S. Cl. ........................................................ 463/42
(58) Field of Search .............................. 463/40, 41, 42, 463/28, 29

(56) References Cited

U.S. PATENT DOCUMENTS 2,044,320 A * 6/1936 Norris .................... 273/143 R
3,091,388 A * 5/1963 Pace .......................... 235/7 A
3,129,004 A * 4/1964 Ritzler ................... 273/143 R
3,468,476 A * 9/1969 Keegan ....................... 235/23
3,735,982 A 5/1973 Gerfin
4,369,361 A 1/1983 Swartz et al.

(Continued)

OTHER PUBLICATIONS

Walker, John. "Urgent Fury", Jan. 1, 1987. [retrived from the Internet on Jul. 24, 2002] URL:<http://www.forumilab.ch/autofile/www/chapter2__52.html>.*

"History and Timeline: Unix Past" The Open Group. [retrieved from the Internet on Jul. 24, 2002]. URL:<wysiwyg://57//http://www.UNIX–systems.org/what__is__unix/history__timeline.html>.*

"The Creation of the UNIX Operating System" Lucent Technologies. [retrieved from the Internet on Jul. 24, 2002]. URL:<wysiwyg://51/http://www.bell–labs.com/history/unix>.*

(Continued)

*Primary Examiner*—Kim Nguyen
(74) *Attorney, Agent, or Firm*—Jones, Tullar & Cooper, PC

(57) ABSTRACT

A video gaming device which includes a game computer which is connected to a central computer and a plurality of player stations connected to the game computer. Connection of the player stations may be effected using an interface device which includes at least one serial port which has a transmit line for transmitting data to a player station and a receive line for receiving data from a player station, input port means and output port means for communication with the game computer, and processing means for routing data between the said serial port and the input and output port means.

6 Claims, 11 Drawing Sheets

U.S. PATENT DOCUMENTS

| | | | | | |
|---|---|---|---|---|---|
| 4,445,187 | A | * | 4/1984 | Best | 463/31 |
| 4,501,422 | A | * | 2/1985 | Leshik | 463/7 |
| 4,572,509 | A | * | 2/1986 | Sitrick | 463/42 |
| 4,575,622 | A | * | 3/1986 | Pellegrini | 463/42 |
| 4,588,187 | A | | 5/1986 | Dell | |
| 4,614,342 | A | * | 9/1986 | Takashima | 463/11 |
| 4,636,951 | A | * | 1/1987 | Harlick | 463/25 |
| 4,760,527 | A | * | 7/1988 | Sidley | 463/13 |
| 4,805,907 | A | * | 2/1989 | Hagiwara | 463/26 |
| 4,852,031 | A | | 7/1989 | Brasington | |
| 4,854,590 | A | * | 8/1989 | Jolliff et al. | 463/17 |
| 4,869,500 | A | * | 9/1989 | Williams | 463/2 |
| 4,924,216 | A | | 5/1990 | Leung | |
| 4,926,327 | A | | 5/1990 | Sidley | |
| 4,964,638 | A | * | 10/1990 | Ishida | 463/27 |
| 4,964,938 | A | * | 10/1990 | Bachmann et al. | 463/42 |
| 4,976,438 | A | * | 12/1990 | Tashiro et al. | 273/313 |
| 5,078,399 | A | * | 1/1992 | Lennon, Jr. | 273/148 |
| 5,078,405 | A | * | 1/1992 | Jones et al. | 463/27 |
| 5,106,091 | A | * | 4/1992 | Comito | 273/309 |
| 5,186,460 | A | | 2/1993 | Fongeallaz et al. | |
| 5,200,890 | A | * | 4/1993 | Pionchon | 463/11 |
| 5,218,190 | A | | 6/1993 | Hardesty et al. | |
| 5,242,163 | A | * | 9/1993 | Fulton | 463/13 |
| 5,294,120 | A | | 3/1994 | Schultz | |
| 5,367,152 | A | | 11/1994 | Krichever et al. | |
| 5,369,262 | A | | 11/1994 | Dvorkis et al. | |
| 5,377,973 | A | * | 1/1995 | Jones et al. | 463/12 |
| 5,377,993 | A | | 1/1995 | Josephs | |
| 5,421,590 | A | | 6/1995 | Robbins | |
| 5,429,361 | A | * | 7/1995 | Raven et al. | 463/25 |
| 5,435,554 | A | | 7/1995 | Lipson | |
| 5,451,054 | A | * | 9/1995 | Orenstein | 273/309 |
| 5,470,079 | A | | 11/1995 | LeStrange et al. | |
| 5,470,080 | A | | 11/1995 | Naka et al. | |
| 5,486,005 | A | * | 1/1996 | Neal | 273/292 |
| 5,497,479 | A | * | 3/1996 | Hornbuckle | 463/29 |
| 5,504,315 | A | | 4/1996 | Hardesty et al. | |
| 5,521,083 | A | * | 5/1996 | Loughran, Jr. et al. | 463/33 |
| 5,551,701 | A | * | 9/1996 | Bouton et al. | 463/35 |
| 5,611,730 | A | * | 3/1997 | Weiss | 463/20 |
| 5,653,637 | A | * | 8/1997 | Tai | 463/36 |
| 5,669,817 | A | * | 9/1997 | Tarantino | 273/309 |
| 5,688,174 | A | * | 11/1997 | Kennedy | 463/37 |
| 5,743,530 | A | * | 4/1998 | Sklad et al. | 273/309 |
| 5,762,552 | A | * | 6/1998 | Vuong et al. | 463/25 |
| 5,770,533 | A | * | 6/1998 | Franchi | 463/42 |
| 5,819,901 | A | * | 10/1998 | Filiberti | 194/202 |
| 5,823,879 | A | * | 10/1998 | Goldberg et al. | 463/42 |
| 5,839,960 | A | * | 11/1998 | Parra et al. | 273/309 |
| 5,842,698 | A | * | 12/1998 | Brown | 273/292 |
| 5,846,131 | A | * | 12/1998 | Kitahara | 463/29 |
| 5,851,147 | A | * | 12/1998 | Stupak et al. | 463/13 |
| 5,885,158 | A | * | 3/1999 | Torango et al. | 463/27 |
| 5,896,125 | A | * | 4/1999 | Niedzwiecki | 463/1 |
| 5,924,926 | A | * | 7/1999 | Brown | 463/11 |
| 5,938,528 | A | * | 8/1999 | Glapion | 273/309 |
| 6,048,269 | A | * | 4/2000 | Burns et al. | 463/25 |
| 6,068,101 | A | * | 5/2000 | Dickenson et al. | 194/206 |

OTHER PUBLICATIONS

Sevrerance, Charles. "A Brief History of Unix". [retrieved from the Internet on Jul. 24, 2002] .URL:<http:vertigo.hsrl.rutgers.edu/ug/unix_history.html>.*

Walker, John. "Urgent Fury", Jan. 1, 1987. [retrived from the Internet on Jul. 24, 2002]URL:<http://www.forumilab.ch/autofile/www/chapter2__52.html>.*

Sevrerance, Charles. "A Brief History of Unix", [retrieved from the Internet on Jul. 24, 2002]. URL:<http:vertigo.hsrl.rutgers.edu/ug/unix_history.html>.*

Symbol Technologies, Inc. Brochures regarding LL425 Interface Controller and OmiLink™ Controller and Specification Sheets, 5 pages.

Drew's distributing Co. Inc. Brochure page.

Ron White: How Computers Work; pp. 105–113; 1994; Emeryville, California.

Parashare 95 Netword Brochure.

* cited by examiner

VIDEO GAMING DEVICE AND COMMUNICATIONS SYSTEM

CROSS REFERENCE TO RELATED APPLICATIONS

The present applications claims priority, under 35 U.S.C. § 119(*e*), on U.S. Provisional Application No. 60/100,449, filed Sep. 14, 1998.

BACKGROUND OF THE INVENTION

The present invention relates to video gaming systems and, more particularly, to improvements in communications, accounting and security systems for video gaming machines.

In many areas, it is necessary to provide a relatively detailed accounting of each video gaming machine's activity to assure that the machine operates within regulated standards. Meters are often provided to track money input into and money dispensed from the machines. Because money may sometimes be inserted to a machine but not wagered, for example where a player inserts a certain amount of cash or credit but cashes out before betting the entire amount, the simple ratio of money in to money out does not accurately reflect the machine's operational activities. Accordingly, it is helpful to also track the amount of money wagered and the amount of money or credits won by the player.

In larger facilities such as casinos, a central computer typically monitors such information for a plurality of embedded system single player gaming machines through a "location controller." Each video gaming machine serially communicates with the location controller to provide appropriate information to the central computer. If the central computer detects an irregularity regarding a particular game, it instructs the location controller to deactivate the game. An exemplary system including a location controller and embedded system circuitry at a video gaming machine for providing information to the location controller is disclosed in U.S. Pat. No. 5,429,361 and U.S. Pat. No. 5,470,079, the entire disclosure of each of these patents being incorporated herein by reference for all purposes.

OBJECTS OF THE INVENTION

The present invention recognizes and addresses disadvantages of prior art construction and methods Accordingly, it is an object of the present invention to provide a video gaming machine system having improved communication with a central computer It is an object of an embodiment of the present invention to provide a video gaming machine system in which video gaming machines communicate with a central computer without the use of a location controller.

The accompanying drawings, which are incorporated in and constitute a part of this specification, illustrate one or more embodiments of the invention and, together with the description, serve to explain the principles of the invention.

SUMMARY OF THE INVENTION

The invention provides an interface device for use in a video gaming device which includes:

(a) at least one serial port which has a transmit line for transmitting data to a player station and a receive line-for receiving data from a player station, (b) input port means and output port means for communication with a game computer, and (c) precessing means for routing data between the said send port and the input and output port means.

Buffer means may be provided-between the serial port and the processing means.

The input port means may include an input buffer and a serial port, and the output port means may include a port and an output buffer.

The device may include means for connecting the processing means to input and output devices.

Preferably the input devices are selected at least from player input buttons or keys, currency acceptor devices, and magnetic and integrated circuit card readers, and the output devices are selected at least from lamps, digital output displays, meters, currency return devices, token dispensers, ticket dispensers and magnetic and integrated circuit card writers.

The invention also provides an interactive video gaming device which includes an interface device of the aforementioned kind, a game computer which is connected to the said input port means and output port means, and at least one player station which is connected to the said serial port.

The game computer may be connected to a central computer.

The device may include a plurality of player stations which are connected in a daisy-chain arrangement to the said serial port.

Alternatively the device includes a plurality of player stations which are connected in a star arrangement to respective said serial ports of the interface device.

The invention further extends to an interactive video gaming device which includes a game computer which is connected to a central computer and a plurality of player stations connected to the game computer.

The invention also provides an interactive video gaming device which includes a central computer and a plurality of daisy-chain connected video gaming machines selected from single player video gaming machines and multi-player video gaming devices connected to the central computer, each single player video gaming machine including a game computer.

According to a different aspect the invention provides a multi-player video game which includes a game computer, a daisy-chain configuration of a plurality of player stations connected to the game computer, a central computer and a location controller connected to the central computer and the player stations.

The invention also provides a multi-player video game which includes a game computer, a daisy-chain configuration of a plurality of player stations connected to the game computer, a location controller, connection means between the location controller and the game computer, and a central computer connected to the location controller.

The invention further extends to a player station for a video gaming machine which includes processing means, first serial input and output ports which are connectable to an interface device, second serial input and output ports which are connectable to a central computer or other similar player stations, a plurality of input devices, a plurality of output devices, and control means connecting the input devices and the output devices to the processing means.

The invention also provides a method of operating a gaming system which includes the steps of transmitting data directly between at least one player station and a Same computer, and transmitting data directly between the game computer and a central computer.

The method may include the step of transmitting data successively between a plurality of the said player stations which are serially connected to the game computer.

Preferably the method may include the step of transmitting data between the game computer and each of a plurality of player stations which are connected in a star arrangement to the game computer.

The method may also include the step of transmitting data between a plurality of single player video gaming machines and the game computer.

The invention also extends to a method of operating a gaming system which includes the steps of transmitting data between a daisy-chain configuration of a plurality of player stations and a game computer, and of transmitting data, via a location controller, between the said configuration and a central computer.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

Figure 1:
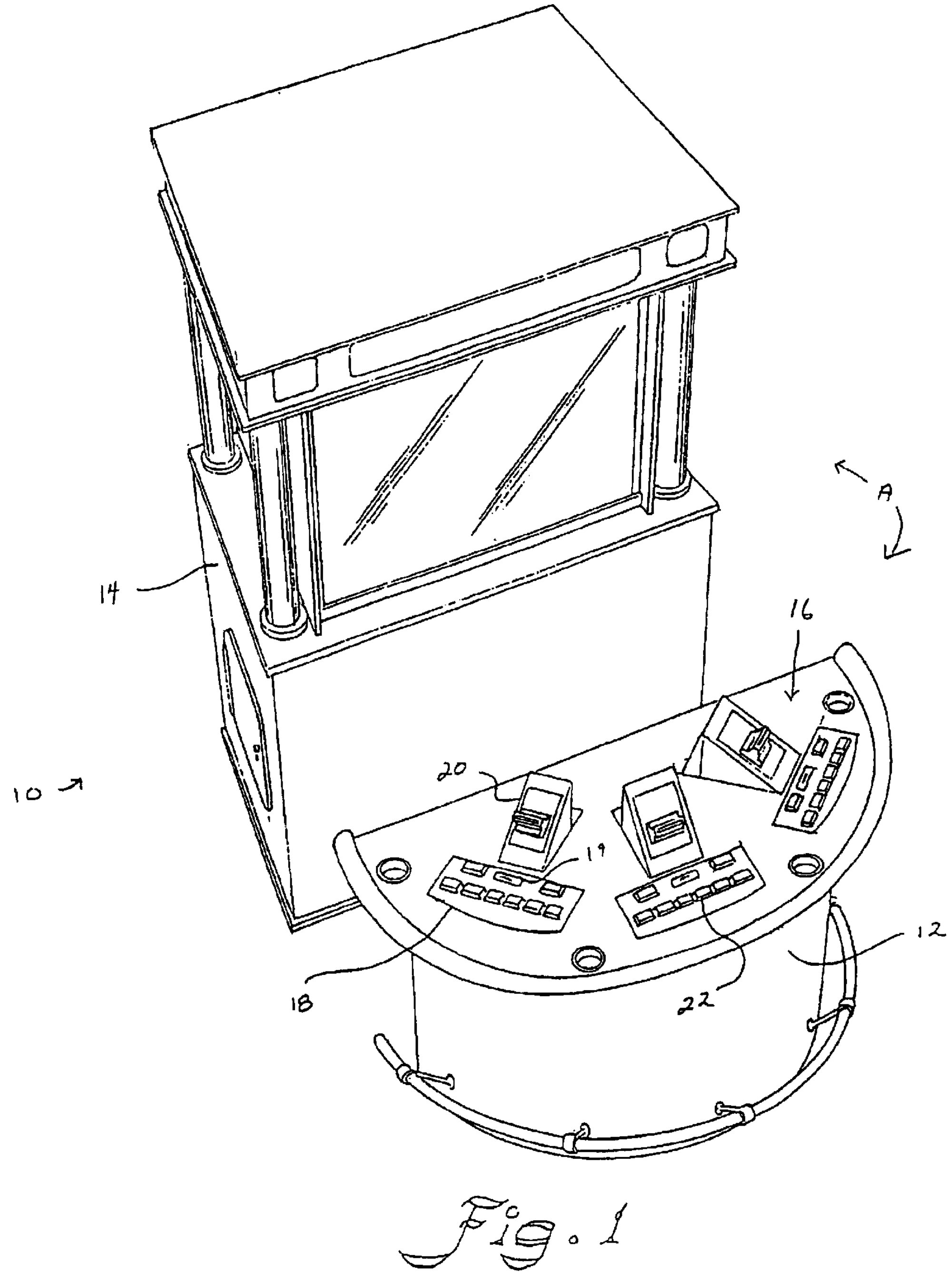
FIG. 1 is a perspective view of a multiplayer interactive video gaming device for use in a system constructed in accordance with the present invention.

FIG. 1 depicts a presently preferred embodiment of a multi-player interactive video gaming device, indicated generally at 10. A cabinet A is divided into player portion 12 and a display portion 14. Display portion 14 and player station 12 are attached by a connection piece (not visible in the view shown) through which communication and power lines may be passed. It should be understood, however, that various cabinet configurations are possible. For instance, the player portion and the display portion may be unitarily constructed. Multiplayer video gaming devices are described in U.S. Pat. No. 5,688,174 and U.S. patent applications Ser. No. 08/885,276 and 08/903,806. The entire disclosures of the '174 patent and the '276 and '086 applications are incorporated by reference herein for all purposes.

Player portion 12 is constructed to simulate a casino blackjack game table. Three player stations 16 are disposed on the top counter surface of player portion 12. Each player station 16 includes a keypad 18 and a currency acceptor 20. Each keypad 18 includes a plurality of input keys 22 through which players participate in the blackjack game. In the embodiment shown, the currency acceptor is a bill acceptor configured to receive bills of various denominations. The currency acceptor could also accost coins.

In this embodiment, each keypad lo includes a first row of five, and a second of two, input keys 22. It should be understood by those ordinary skill in this art that the use, number, and arrangement of such keys an depend upon the nature of He video gaming program operated within the present invention. For example, a blackjack game may require she use of different keys for different purposes than a poker game. Bill acceptor 20 accepts bills or betting and/or game fee purposes.

A ticket dispenser 19 is mounted at each player station. Players may "cash out" at any rime by inputting a proper command at their player station. Upon cashing out, a printer mounted within the cabinet prints a redeemable ticket indicating the player's winnings via ticket dispenser 19. In other embodiments, a single printer is provided in the cabinet to print redemption tickets for all players.

Figure 2:
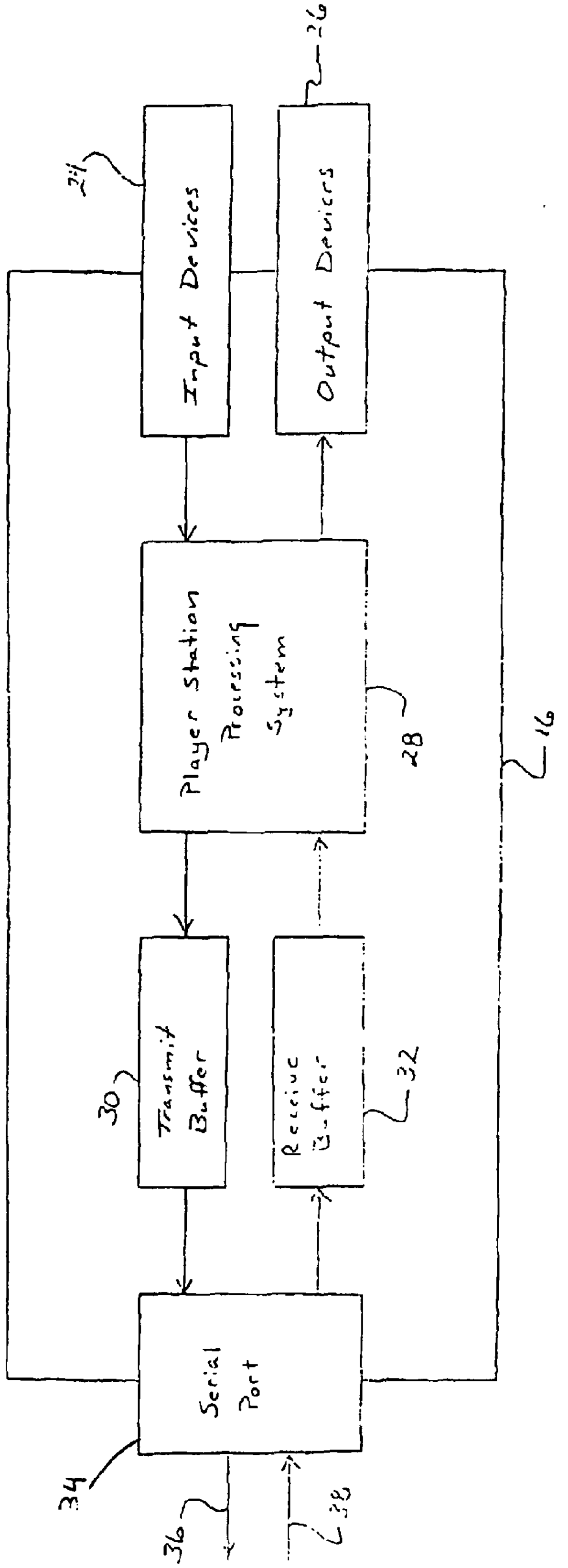
FIG. 2 is a block diagram illustration of a preferred embodiment of a player station that may be used in a multi-player interactive video gaming device as in FIG. 1.

A functional illustration of a player station 16 is provided in FIG. 2. As indicated above, the player station includes a plurality of input devices 24, which may include, for example, player input buttons 22 and currency acceptor devices such as bill acceptors 20 (FIG. 1). Player station 16 also includes output devices 26, which may include lamps, digital output displays, meters and/or currency return s devices such as token dispensers or ticket dispensers 19 (FIG. 1), which output currency to players in the form of redeemable tickets. Currency acceptor and return devices may include magnetic card readers/writers and IC card readers/writers to accept and/or pay out currency electronically.

Player input messages are transferred from the player stations to a workstation/including a game processor running the video gaming program. The workstation may include a data port, such as a serial port or a keyboard port, an input/output system, and a suitable communication arrangement communicating with a remote game computer. Accordingly, a workstation assembly may comprise a local computer, to receive input from a plurality of player stations, and a remote computer, to receive input signals from the local computer and execute the game program responsively to such signals. The local and remote computers may communicate through any suitable arrangement, for example telephone systems or local area network systems. The remote computer's game processor thereby receives input signals from the data port of the local computer. In this arrangement, a single game processor may operate a plurality of remote player station groups. Alternatively, a workstation assembly may comprise a remote computer and a communications system, such as a telephone system or local area network system, through which multiple player stations communicate with the remote computer. Thus, a plurality of single-player stations separated by relatively long distances may participate in a single-player or multi-player game operated by the remote computer.

Additionally, however, the workstation may be a personal computer assembly including an input/output system, one or more data ports and a game processor device in a local unit. As should be understood in this art, a personal computer is a relatively small, for example as compared to a main frame, computer that is typically designed for use by a single user or by multiple users through a network. It employs components such as a central processing unit (CPU), memory, and an input/output system by means of an operating system such as WINDOWS95. The CPU is an integrated circuit "chip" that can perform a multitude of operations. The input/output system manages data handling among the CPU and other internal or external components. Thus, the personal computer is a general purpose computer, as opposed to single-program "embedded" system, which may include a dedicated processor device mounted on a printed circuit board and configured to perform a single function. A personal computer assembly may be a board including a processor and an input/output system. It may also include a cabinet and/or various external and internal components, as should be understood in this art.

Because it is a multipurpose device, the personal computer assembly typically has no permanent input or output device having direct communication to the circuit board or, if there is more than one board, to the main circuit board. Instead, data is conveyed between input and output devices and the input/output system by data ports. These ports may have predetermined uses, for example to receive input from a keyboard or a mouse or to direct output to a printer or monitor. Personal computers also often include expansion slots for additional circuit boards which may, in turn, include their own data ports.

Although a personal computer assembly is the workstation type most often discussed herein, it should be understood that this is for exemplary purposes and that all workstation configurations, provided they are suitable for a given embodiment, are within the scope and spirit of the present invention. The remote computer in any of these arrangements may operate a progressive jackpot feature in which all communicating player stations may participate.

The player input message is the information input at the player station, for example by player activation of a button or bill acceptor or by system activation of a maintenance condition at a token dispenser, and conveyed to the personal computer through the player station and interface assembly equipment. During the transmission, the message may take a variety of forms. For example, in a preferred embodiment as illustrated in the figures, one type of player input message may be input by pressing a button 22 (FIG. 1). As discussed in more detail below, this delivers a signal, for example a pulse, to the player station control mechanism, which identifies the pulse and selects an appropriate ASCII input code. The player station outputs the ASCII input code to the interface assembly, where the interface assembly control mechanism converts the input code to a scan code for transmission to the personal computer.

Another type of player input message may be input by activating a bill acceptor. The bill acceptors may deliver input signals to the player station control mechanism in a variety of forms, for example as a series of pulses or as a digital word. It should be understood that all such configurations are included within the scope and spirit of the present invention.

The internal components:of player station 16 are illustrated functionally in FIG. 2 by player station processing system 28, transmitting buffer 30 and receiving buffer 32. In a preferred embodiment, processing system 28 receives data directly from input devices 24. If many input devices are employed on a player station, however, it is possible to create a row/column matrix for routing data via multiplexing to the Processing system, as should be understood in this art.

In operation, if the processing system 28 detects, for example, a falling pulse indicating that is a particular button has been pressed, the processing system associates the pressing of that button with an appropriate code. In a present embodiment, the code is a four character message. The first character indicates that the message is beginning. The second character indicates the message type, which identifies the message as, for example, a button message or a dollar bill acceptor message. The third character provides the message information, for example that button number three has been pressed. The fourth character indicates the end of a message. The coding prevents information loss and/or message scrambling when the messages are queued or dequeued.

After creation of the appropriate code, the message is stored in transmitting buffer 30. A serial port 34 is provided on player station 16 to output the data stored in buffer 30. The serial port converts data from a parallel format to a serial format to transmit and converts from a serial format to a parallel format to receive. Status signals indicate whether the transmitter is available (empty) and whether the receiver contains data (full). Two data lines, transmit line 36 and receive line 38, are connected to serial port 34. Processing system 28 monitors a status signal associated with transmit line 36. When a "transmitter empty" condition is indicated, the next message character in transmit buffer 30 is transmitted through serial port 34 along transmit line 36.

Data received from receive line 38 through serial port 34 is stored in receive buffer 32. Processing system 28 receives messages from buffer 32 and acts according to instructions provided thereby. Thus, processing system 28 may be caused to illuminate lamps at the player station, dispense coins through a token dispenser, print a cash out ticket, or other desired functions.

Figure 3:
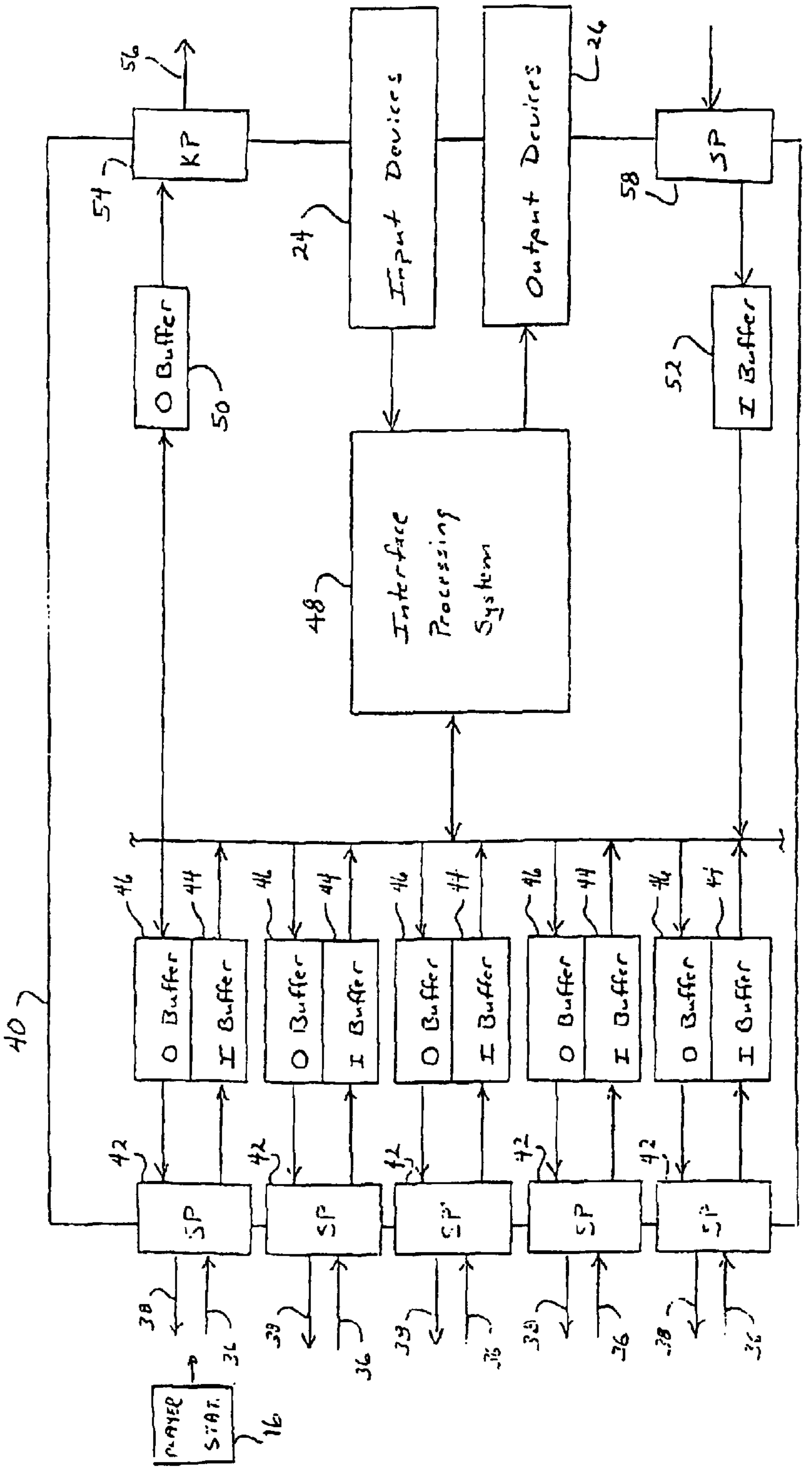
FIG. 3 is a block diagram illustration of a preferred embodiment of an interface device concentrator used in a multiplayer interactive video gaming device constructed in accordance with the present invention.
Figure 7:
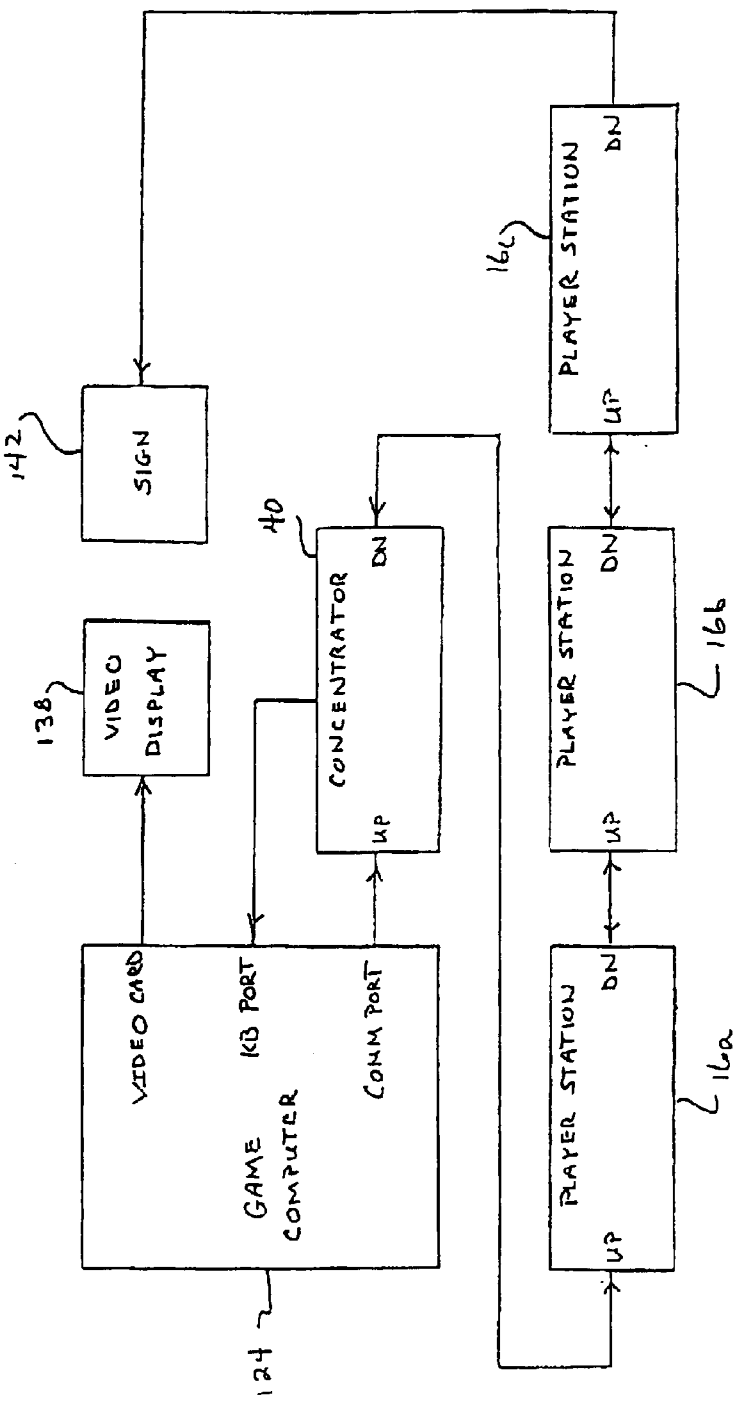
FIG. 7 is a block diagram illustration of a preferred embodiment of a multi-player interactive video gaming device in a daisy-chain arrangement.

In a star arrangement, each player station 16 communicates with a central interface device for transferring player input messages to the game computer. As illustrated in FIG. 3, each player station communicates by its respective transmit line 36 and receive line 38 with an interface device or concentrator 40 via serial ports 42. Five player stations may be employed within the .construction illustrated in FIG. 3, although less than five, for example three, may be used. In a daisy-chain arrangement as illustrated in FIG. 7, the player stations may be connected in tandem so that messages move in and out of successive player stations until reaching the central interface device. Each player station includes an additional serial port and buffer, and each player station processing system generates new messages to the next player station to pass on a message received from a prior player station.

Referring again to FIG. 3, interface 40 includes receive buffers 44 and transmit buffers 46 corresponding to each player station. An interface:

processing system 48 controls the transfer of an information between the receive buffers 44 and interface output buffer 50 and between an interface input buffer 52 and the transmit buffers 46. When processing system 48 receives an incoming message from a receive buffer 44, the processing system converts the message to a scan code which the operating system on the game computer will recognize. The scan codes are routed to and stored in transmit buffer 50, which communicates with the game computer via interface keyboard port 54. A transmit line 56 connects interface keyboard port 54 with a game computer keyboard port. Processing system 48 monitors transmit line 56 and, when no data is present on transmit line 56, outputs the scan codes stored in transmit buffer 50 to the game computer over transmit line 56 through keyboard port 54.

The scan codes are received by the game computer through its keyboard port. The use or the game computer keyboard port has certain advantages. For example, general purpose computers are Typically sold wit, operating systems configured to receive and recognize scan codes from the keyboard port. Thus, the game program may be constructed around the standard keyboard key strokes that the scan codes represent, and the video gaming programmer may rely on the built-in operating system to receive and process input data without having to program a custom data operating and error checking system. Some recent operating systems, for example WINDOWS95, receive and process data from operating system ports other than the keyboard port, for example certain COMM ports.

While the operating system does not recognize "key up" and "key down" events from these other ports, applications running on the operating system may otherwise take advantage of the operating system to deliver data from them. For illustrative purposes, not for purposes of limitation, communication by keyboard port is primarily discussed herein.

Data is routed between the player stations and the game computer through processing systems 28 and 4B, illustrated in FIGS. 2 and 3, and the input and output buffer systems, without loss of information.

Thus, if two players press input buttons at their respective player stations simultaneously, both input messages will be received by the game computer.

Is Commands from the game computer to player station output devices are transmitted to interface input buffer 52 via interface device serial port 58. Processing system 48 receives messages from buffer 52, determines to which player station the command should be forwarded, and stores the command in the appropriate output buffer 46 for transmission to the player station via the corresponding serial port 42. If the system is daisy-chained, only one transmit buffer is required. As each message is received by a player station, it is relayed to and examined by the next player station. If the message is found to be for this player station, that station's processing system performs the requested action.

Processing system 48 may also communicate directly with input devices 24 and output devices 26.

These may include the same input and output devices discussed above with respect to the player stations.

That is, the input and output devices of a single player station may be directly connected to interface device 40 without a player station processing system 28 and buffers 30 and 32 (FIG. 2) that are associated with the individual multiple player stations. Thus, the game computer/interface assembly may be used with player stations of single player games which do not have such processing systems or buffers. Accordingly, the game computer/interface assembly may be used interchangeably with a multiplayer or a single player configuration. Video gaming machines may be constructed with removable player station units so that the game may be converted between a multi-player game and a single player game simply by interchanging the player station unit or units. Provision may be made to reprogram or convert the game computer to a new or previously or stored program to enable operation of the new game.

In another preferred embodiment, the interface device may be physically embodied on a player station so that player station communicates with the game computer through the keyboard port. Other player stations output messages to the game computer through this first player station to avoid loss of information. Player station units may be linked to the first player station in a star or daisy-chain arrangement and may be added or removed to achieve a desired number of player stations.

As described above, processing system 48 receives incoming codes from the player stations and converts the codes to scan codes which the operating system on the came computer will recognize. Since there are a finite number of messages which will come from any planer station, a unique scan code at be assigned to each Particular message from each player station.

This may be accomplished, for example, by converting player station messages into keyboard scan codes. Thus, in a preferred embodiment, each player station includes similar input devices in a similar arrangement and outputs the same messages for the same corresponding devices. Processing system 48 assigns scan codes based upon the player station message and the player station itself. Thus, the assignment of the scan code depends upon the particular message and the particular player station from which the message is received.

It should be understood, however, that various suitable configurations are possible. For example, while in a preferred embodiment the player station processing systems assign ASCII codes as the player station messages, various coding processes may be employed. Thus, for example, scan codes could be assigned at the individual player stations, eliminating the need to make the assignment at the interface device.

In the illustrated local unit embodiment, the game computer is, preferably, an IBM PC/AT compatible personal computer. Thus, the scan codes assigned by processing system 48 are compatible with the operating system provided on those computers. The operating system is configured to receive the scan codes from the computer keyboard port and to use those codes for operating system functions and/or higher level functions. In particular, the IBM PC AT compatible computers may receive the scan codes and convert them to ASCII codes, which may be output to a screen and which may be used in commercial or custom software, including the gaming program.

Figure 4:
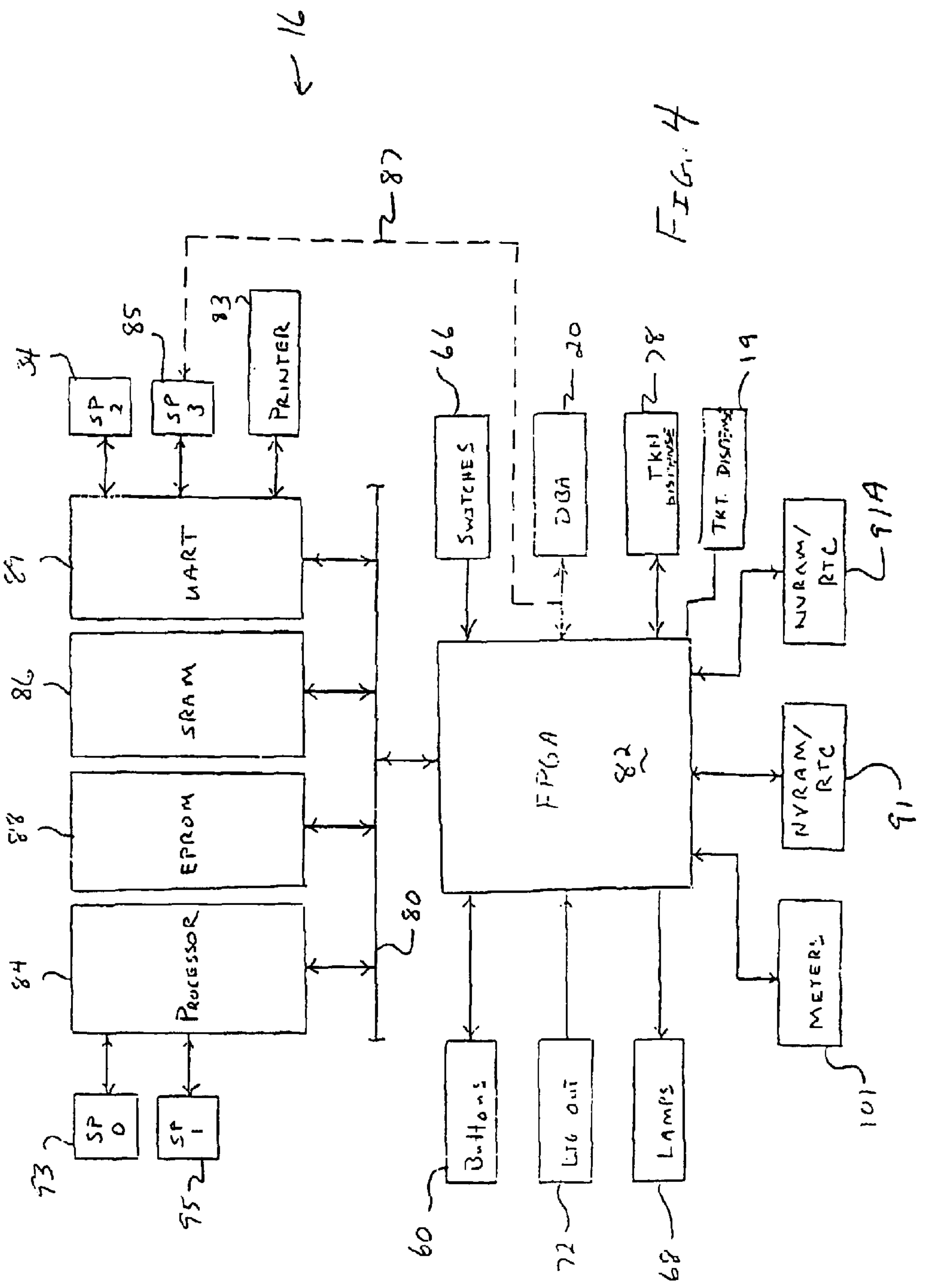
FIG. 4 is a schematic diagram of a preferred embodiment of player station hardware used in a multiplayer interactive video gaming device constructed in accordance with the present invention.

A schematic illustration of a player station is provided in FIG. 4. A plurality of buttons, which for example may be installed in groups of up to eight buttons 22 (FIG. 1), are indicated at 60. Thus, if three button groups are used, the player station may include a total of 24 input buttons. A bill acceptor is controlled by a series of dip switches 66, which may be used to program the bill acceptor to, for example, accept certain bill denominations and/or select serial or pulse mode operation.

Output devices includes lamp groups 68 and digital output groups 72. As with the button groups, each lamp group and each digital output group includes eight lamps and eight digital output devices, respectively. It should be understood, however, that all of the available input and output devices may not necessarily be employed in a particular game; the exemplary construction illustrated in FIG. 4 merely indicates that they are available. Other output devices include a token dispenser and/or ticket dispenser indicated at 78.

Data is transmitted to or from these input and output devices on 8-bit data bus 80 and is controlled by field programmable gate array 82. Gate array 82 may be, for example, a Xilinx XC3042 or XC5202 gate array; or other suitable device.

Data transfer from the player station is controlled by a processor 84 which, i one preferred embodiment, is an 8051-compatible microcomputer having one or two on-chip serial ports. It should be understood that other processing devices may be used, for example those including on-board EPROMs. Although processor 84 includes a certain amour: or memory, SRAM 86 provides additional storage. Together, this memory serves as the player station buffers. PROM 88 provides storage for the programming for processor 84 and the look-up tables by which input codes may be assigned to particular input signals. A PAL (not shown), for example a 20V8 PAL, is provided to decode the microprocessor address range into three ranges—EPROM, processor and input/output devices, including the gate array.

In operation, processor 84 controls gate array 82 to input and output data to and from the input devices and output devices. An internal logic signal of the gate array 82 causes gate array 82 to send an interrupt signal to processor 84 every 25 milliseconds. In response to this interrupt command, processor 84 orders gate array 82 to sequentially place the contents of the data registers of the respective button groups on data bus 80. Thus, if a player presses one of the buttons in a particular button group, the corresponding position in the button group register in the gate array changes state. Following the next 25 millisecond interrupt signal, processor 84 causes gate array 82 to output the contents of that button group's register, in order among the other button groups, to common bus 80. In the embodiment depicted in FIG. 4, a button group may include up to eight buttons so that each button position of the button group register may correspond to a data line on eight bit bus 80. Thus, of the ago eight data lines input to processor 84 from bus 80, seven are at a normal state while one has changed state due to the pressed button. Because processor 84 causes gate array 82 to output the button group registers to the common bus in a certain order, processor 84 knows which button group is connected to the common bus at any time. In this manner, the processor identifies the particular button group from which it receives an input message,. The particular button or buttons within the button group is determined by the line or lines on common bus 80 that have changed state.

Once processor 84 determines that a particular button in a particular button group has been pressed, it generates an ASCII code corresponding to that particular button. This can be done, for example, either by an algorithm that is part of the processor 84 program or according to a lookup table stored in EPROM 88. Once the code is established, it is translated into a message which is stored in a transmit buffer in SRAM 86 until processor 84 determines that the serial transmitter 89 of serial port 34 is free. When the output line is free of data, processor 84 outputs the stored ASCII codes from SRAM 86 through serial port 34 to the output data line.

If two or more buttons in a button group are simultaneously pressed, processor 84 converts each signal into a corresponding ASCII code and stores signals in SRAM 86 according to a predetermined order, for example depending upon the data line over which they were received. The corresponding messages are output through serial port 34 in the order in which they are stored in SRAM 86. By this protocol, simultaneous button activations are accommodated without information loss.

This assumes, however, that the activation of all the buttons represents information—data that the game program should receive to operate properly. In some games certain buttons, for example "Bet" or "Hit" buttons, are inappropriate at certain times. While the game program itself may be configured to ignore the data resulting from these button activations once such data is received, the program may control processors 84 and 96/to FIG. 5 mask these buttons so that the data is not forwarded to the game computer. Additionally, the processors may be programmed to recognize one or more button activations, and not recognize one or more others, when buttons are simultaneously activated where the latter buttons may always be ignored in favor of the former buttons. In any event, the video gaming device may be configured to ignore button activations which do not represent information while maintaining the ability to process those simultaneous button activations chat do.

Processor 84 may also receive inputs from bill acceptor 20, token dispenser 78 and/or ticket dispenser 19 through the gate array. Alternatively, bill acceptor 20 may communicate directly with processor 84 through serial port 85, as indicated by dashed line 87. The inputs from bill acceptor 20 primarily relate to the amount of currency input by the player. Inputs from the token dispenser generally concern errors, for example that there are insufficient tokens in the dispenser. Inputs from ticket dispenser 19 may include error signals but may also include signals indicating, for example, that a ticket has been printed and dispensed.

These devices are programmed to output an appropriate message to gate array 82 in a predetermined format, for example ASCIL hexadecimal. Upon receipt of such a message, gate array 82 stores a digital signal indicating the origin of the message and sends a second interrupt signal co processor 84. Upon receipt of this type of interrupt signal, processor 84 reads the identifying signal stored in gate array 82 and causes gate array 82 to pass the input from that particular device to common bus 80 where it is read by processor 84. Processor 84 converts these messages, either by a program algorithm or by a lookup table, to an ASCII code which is output by serial port 34.

Processor 84 may drive a parallel printer 83 to print redeemable coupons. This arrangement may be used in place of a ticket dispenser that outputs preprinted tickets in fixed denominations. In addition, a central printer driven by the game computer may be used instead of individual player station printers.

Data commands to a player station are received through serial port 34 by processor 84, which stores the command in SRAM 86. The command will identify a particular output device, for example ticket dispenser 19 or a lamp in a lamp group 68. Assuming the latter, processor 84 writes appropriate data on bus 80 to drive the particular lamp, while preserving the previous state of the other lamps in the group, and instructs gate array 82 to apply this Instruction to the appropriate lamp group. Instructions to bill the acceptor 20, token dispenser 78 and ticket dispenser 19 are generally in the form of digital words which are downloaded to the particular devices through gate array 82. These output devices are configured to receive this information and act accordingly. The particular construction and configuration of these devices are well known in the art and need not be described herein.

Player station 16 also includes two nonvolatile RAM/real-time clocks 91/and 91A for maintaining data between power cycles and for power-off intrusion detection. The battery-powered devices remember hot many tokens are deposited during a vend cycle as the tokens are being deposited. Thus, if the machine is to deposit ten tokens, but power fails after only six are deposited, the NVRAM/RTCs 91 notify processor 84 and/or the game computer that four additional tokens should be deposited. As indicated in FIG. 4, NVRAM/RTCs 91 communicate with processor 84 through gate array 82.

Two NVRAM/RTCs 91 are provided for error checking purposes. During a vend cycle, for example, one NVRAM/RTC 91 is incremented before a token is deposited, and the other is incremented after the token is deposited. Accordingly, following a power-up, a vend cycle or a token deposition, microprocessor 84 detects an error if the registers of the two NVRAM/RTCs do not agree. In this case, processor 84, the game computer or a central computer may shut down further operations of the player station 16 until the error is resolved.

NVRAM/RTCs 91 also provide a security function.

In a preferred embodiment, switches are disposed at the game machine's money pit and electronics pit so that if the door to either is opened, a line is pulled low. Each line is connected to a respective NVRAM/RTC 91 so that if it goes low, the memory register for the respective NVRAM/RTC 91 is cleared. If processor 84 detects this condition, for example following power-up or after a periodic scan, an error is detected, and the processor or game computer stops the player station's activity until the error is resolved.

Further, upon detection of an error processor 84 may output an appropriate message through serial port 34 to a central computer that, in turn, may provide notification to an operator. In investigating and attempting to resolve the error, the operator may communicate with processor 84 through serial port 93 with an appropriate computer or other device. As indicated in FIG. 4, serial ports 93 and 95 are on-chip ports of processor 84. Serial port 95 may be used as an alternative port by which to communicate with the central computer or other player stations, as discussed in more detail below.

Player stations 16 communicate with the game computer through a concentrator board 40 (FIG. 3). A schematic illustration of concentrator board 40 is provided in FIG. 5. In the star arrangement, each player station communicates with concentrator board 40 from the player station's serial port 34 (FIG. 4) to a serial port on the concentrator board. Four serial port groups 90 are provided on the concentrator board. Each serial port group 90 includes four serial ports, each having an input line and output line. Thus, each serial port group has eight data lines in communication with an eight bit data bus 92. Accordingly, in the configuration illustrated in FIG. 5, sixteen player stations may be connected to concentrator board 40, although in preferred embodiments three or five player stations are employed.

Field programmable gate array 94 controls communication of data along bus 92 between a processor 96 and the ports and devices communicating with the bus. Any suitable processing device, or example an 8051-compatible microcomputer, may be used. Gate array 94, EPROM 98 and SRAM 100 may include the same or similar components as the corresponding components on the player stations.

EPROM 98 stores the program executed by processor 96. Processor 96 may include its own internal memory for use as buffers. Preferably, however, SRAM 100 is included to provide additional memory.

A player input message from a particular player station is received at a serial port, which communicates with that player station, in one of the serial port groups 90, where it is stored in the serial port group register. Upon receipt of an interrupt signal periodically sent by gate array 94, processor 96 instructs gate array 94 to sequentially connect the register of each serial port group 90 to the eight data lines of common bus 92. In this manner, processor 96 is able to determine from which serial port, and therefore from which player station, it receives data. Processor 96 stores the incoming data either in its internal memory or in SRAM 100.

As discussed above, the incoming messages are in the form of ASCII codes. Processor 96, either by computer program algorithm or by a look up table stored in EPROM 98, assigns a scan code appropriate for the particular ASCII character from the particular player station. The scan code is then stored in SRAM 100.

Processor 96 monitors the status of keyboard output port 102 by gate array 94. If the output data line is clear, processor 96 outputs the stored scan code from SRAM 100 over bus 92 to gate array 94 to keyboard output port 102. Keyboard output port 102 communicates with the game processor via a personal computer keyboard port.

Data may be downloaded from the game computer via a keyboard input port 104 or serial port 106. If data is downloaded to keyboard input port 104, gate array 94 sends a second interrupt signal to processor 96, which then instructs gate array 94 to put the data on common bus 92 for storage in SRAM 100. Data downloaded through serial port 106 is stored by processor 96 in SRAM 100. If the incoming message is a command for a player station, processor 96 causes gate array 94 to connect the appropriate serial port in the appropriate serial port group 90 to common bus 92 and outputs the command to the common bus.

Figure 5:
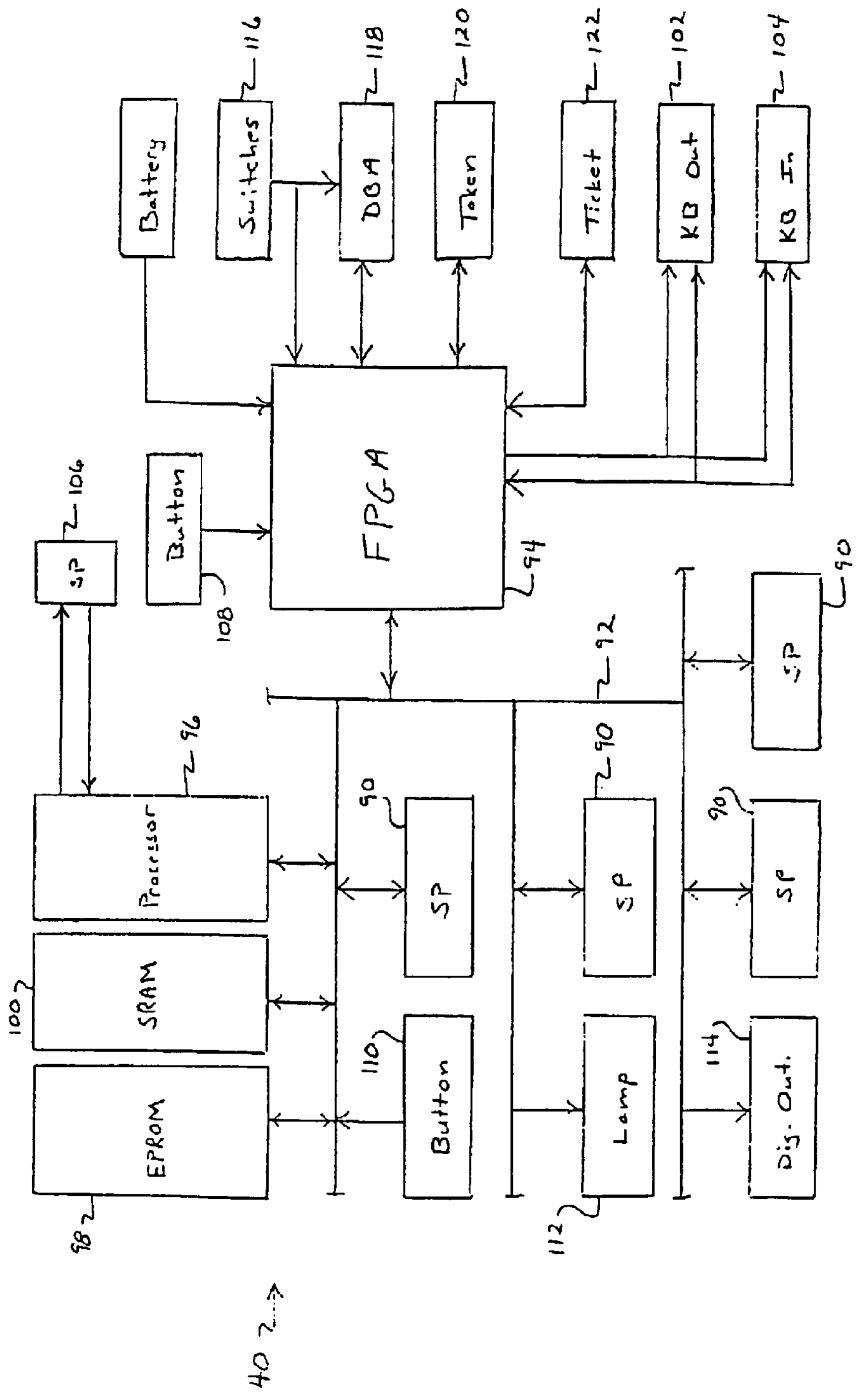
FIG. 5 is a schematic illustration of a preferred embodiment of an interface device concentrator used in a multi-player interactive video gaming device constructed in accordance with the present invention.

Concentrator board 40 also includes connections for button groups 108 and 110, lamp group 112, digital output device group 114, switches 116, bill acceptor 116, token dispenser 120, and ticket dispenser 122. These connections are provided for direct connection of their associated devices to concentrator board 40. Thus, concentrator board 40 may be configured to function as a single player station, operating as described above regarding player stations 16 (FIG. 4). Thus, in a preferred embodiment, a game cabinet may be constructed housing a personal computer assembly and a concentrator board assembly wherein the player stations are removable. Thus, multiple player stations may be installed and connected to serial ports in serial port groups 90 for communication to the game computer through the concentrator board. The game may, however, be converted to a single player game by removal or deactivation of the multiple player stations and installation of a single player station whose components connect directly to the concentrator board 40 as indicated in FIG. 5. Multiple alternative game and operating programs may be stored in, or programmed into, the game processor and the concentrator board processor so that they may operate in the new configuration. Thus, a game assembly may be convertible between a single player and a multiplayer configuration.

Although the button groups, serial ports, lamp groups and output device groups are illustrated in FIG. 5 as being connected to bus 92 so that gate array 94 may selectively connect their registers to the bus, it should be understood that these devices may be connected to the bus through the gate array.

Figure 8:
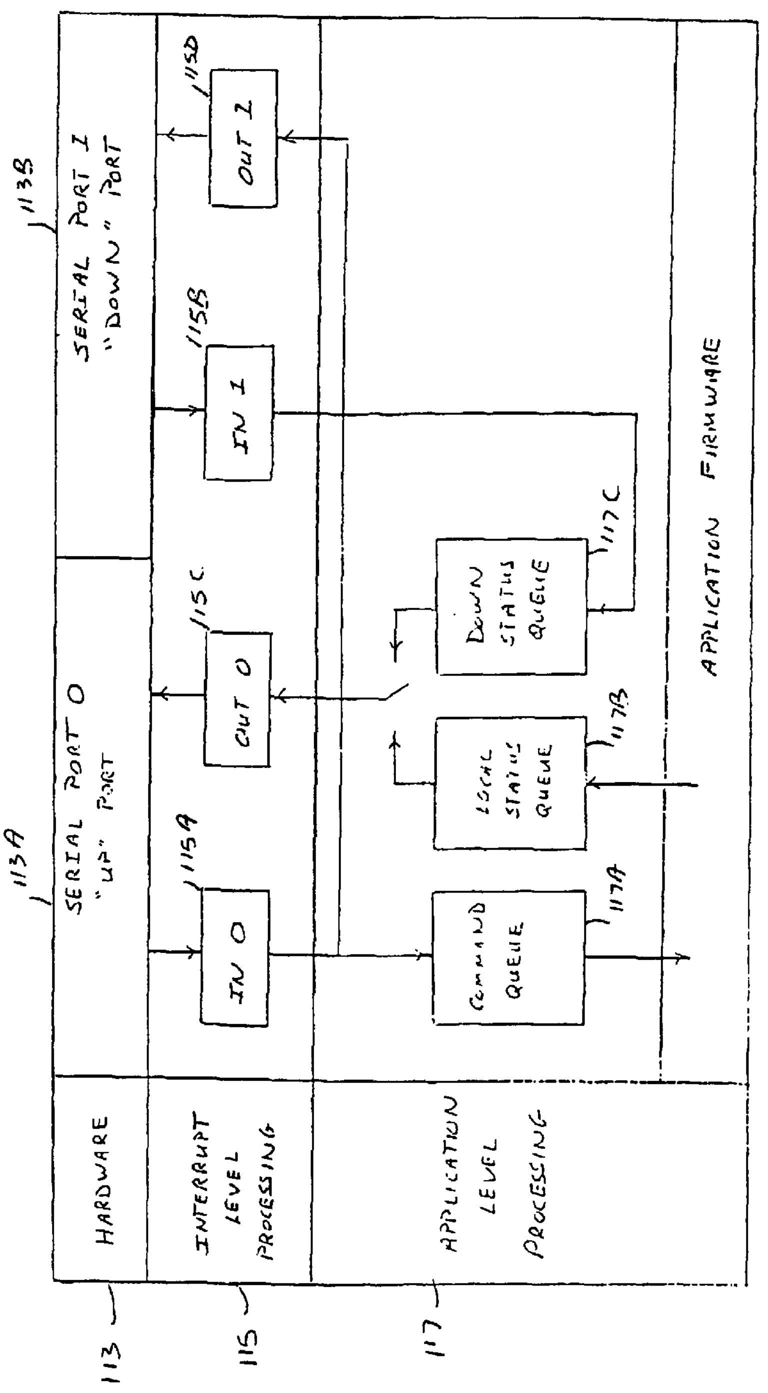
FIG. 8 is a block diagram illustration of a preferred embodiment of a station architecture used in a multi-player interactive video gaming device in a daisy-chain arrangement.

FIGS. 7 and 8 illustrate a daisy-chain arrangement of the present invention. In the embodiment illustrated in these figures, a serial port of game computer 124 is the head of a bidirectional RS-232 network implemented using intelligent controller cards, each having two serial communications ports termed the "up" and "down" ports. In general, commands from the game computer flow first into the concentrator up port, the first external node in the network. Commands from the game computer are echoed to the concentrator down port and output to the first player station, player station 16*a*, up port. If the command is intended for processing by this player station, the command message is parsed and queued. Otherwise, the message is echoed to the player station's down port and output to the next player station up port. Player input messages generated by the player station and player input messages received from other player stations through the player station's down port are queued and dequeued, for example in round-robin fashion, to the station's up port as complete messages as they become ready.

Command messages and player input messages are processed at the non-interrupt level. Serial port buffers are managed at the interrupt level. This prevents loss of data when the processor is busy with local tasks.

In this fashion, command messages are passed from the game computer to specific player stations, and input messages from the player stations are passed up to the game computer. The concentrator 40 receives command messages from the serial communications port of game computer 124. It routes input messages from player stations to the game computer through its keyboard port. Thus, input messages may be directed to the computer as keyboard scan codes as described above.

Each of the tandemly-linked player stations illustrated in FIG. 7 may be configured as shown in FIG. 4 with the use of serial ports 34 and 95. Thus, one of the serial ports is used as the up port, and the other is used as the down port. The up ports and down ports are bidirectional. Thus, assuming player station 16 illustrated in FIG. 4 is player station station 16*b* illustrated in FIG. 7, the up serial port 34 receives command messages from, and outputs input messages to, the down port of prayer station 16*a*, while the down port receives input messages from, and outputs command messages to, the up port of player station 16*c*. Command messages received by the up port are stored in SRAM 86. The command message includes an identifier indicating for which player station it is intended. Processor 84 reads the Identifier and, if the command message is intended for player station 16*b*, acts upon the message as described above. If, however, the command message is intended for player station 16*c*, processor 84 directs tie message to the down port for output to player station 16*c*.

Player station 16*b* receives input messages from player station 16*c* through its down port and stores them in SRAM 86. Since these messages are intended for the game computer, processor 84 directs them to player station 16*a* through the up port. The input messages from player station 16*b* are also passed to player station 16*a* through the up port.

Processor 84 may simultaneously receive and store messages from its dual serial ports (the up and down ports). If a message is to be passed through the player station, processor 84 may simply direct the message from one serial port to the other, or it may place the message on SRAM 86 for output at a later time. In any event, a player station may process command and input messages received from external sources while generating its own input messages without losing information even if, for example, a command message and an input message are received at the same time a button is pressed at the player station. Thus, from the perspective of player station 16*b*, the interface between it and game computer 124 is concentrator 40 and player station 16*a*.

A receive-only serial device, such as sign 142, may be connected on the end of the chain. The network messaging protocols may be designed to allow other devices to be connected without mutual interference. That is, the message formatting for the player station network may be different than that used by the sign, and the two protocols may coexist without interference.

FIG. 8 illustrates one preferred player station network architecture. There are three distinct processing levels for handling network traffic. At the hardware level/113, two standard on-chip serial communications ports/113A and 113B handle all data serialization and deserialization. At the interrupt level/115, the onboard processor handles characters received from or sent to the serial ports. At the interrupt level, the processor manages two receive buffers/115A and 115B an two transmit buffers/115C, 115D. At the applications level/117, where all of the application's code has the same execution priority, the processor queues and dequeued messages in three queues/117A, 117B, 117C. E input queue/117A holds parsed command messages for processing by the application firmware. Two output queues/117B, 117C hold complete input messages from the player station to be passed, using an arbitrary prioritization scheme, to the up port's output buffer.

Round-robin prioritization, for example, may be used to empty the output queues.

The above description illustrates both a star and daisy-chain arrangement. The concentrator and player stations support either topology. While the concentrator arrangement may exhibit superior performance, the daisy-chain arrangement is, generally, less expensive. The choice among star, daisy-chain and a combination of the two arrangements will depend upon the requirements of a specific application.

Figure 6:
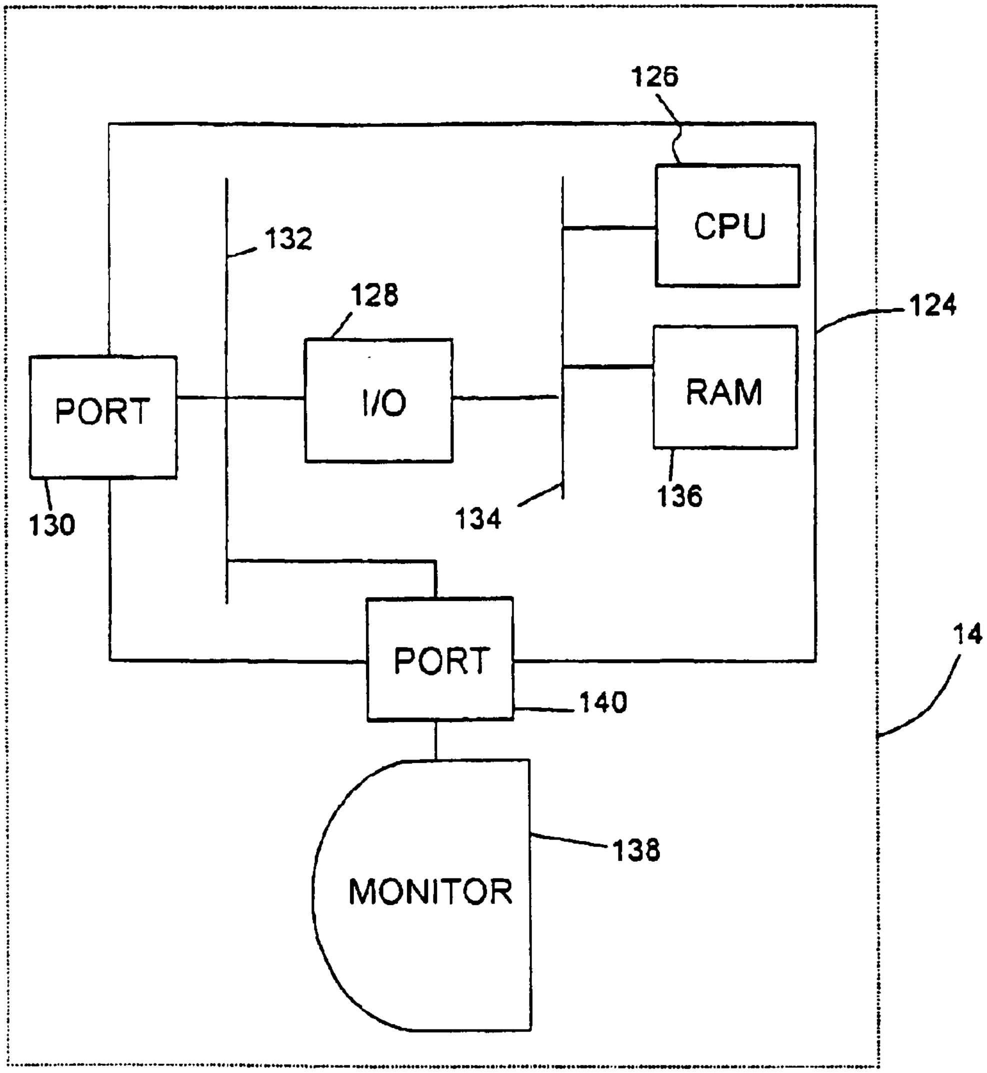
FIG. 6 is a partial schematic diagram of a preferred embodiment of a multi-player interactive video gaming device for use in a system constructed in accordance with the present invention.

Referring now to FIG. 6, personal computer assembly 124 houses a game processor such as a CPU 126, for example a PENTIUM processor, for executing a blackjack gaming program responsively co the player input messages from player stations 16 (FIG. 4). An input/output system such as a BIOS 128 receives the input messages from concentrator boar keyboard output port 102 (FIG. 5) by keyboard port 130 and bus 132. BIOS 128 outputs a signal to CPU 126 over a bus 134. As should be understood by those of ordinary skill in the art, BIOS 128 may decode or encode signals received by CPU 126 depending upon, for example, the configuration of the personal computer assembly.

Moreover, a variety of circuitry configurations are possible within the range of personal computers. For example, a variety of input/output, memory (for example RAM 136), buses, and other devices may be arranged in various suitable configurations. Furthermore, various methods may be employed utilizing such devices and configurations in communicating information between keyboard port 130, or other suitable data input port, and CPU 126. It should be understood that all suitable such personal computer configurations may be employed in accordance with the present invention.

As it executes a video card gaming program, CPU 126 outputs video display signals to a monitor 13B via a parallel port 140. The video card gaming program executed by CPU 126 permits interactive participation by a plurality of players at player stations 16 (FIG. 1).

The video card gaming program is preferably written in an "event-driven" language such a Visual Basic or Visual C. An event-driven program performs operations responsively to "events" such as the depression of a push button that, in turn, causes BIOS 128 to output a signal to CPU 126. As should be understood by those of ordinary skill in this art, personal computers are generally equipped with operating systems which are configured to manage communication between the personal computer and the software programs. In particular, the operating system is configured to recognize certain signals, for example scan codes received by the keyboard port and to convert such signals into predetermined codes, for example ASCII codes, which may be utilized by the program. In a preferred embodiment, personal computer assembly 124 is an IBM-compatible system using a MSDOS-compatible operating system. The scan codes assigned by the concentrator board (FIG. 5) are converted by the operating system to ASCII codes which are utilized in operation of the video card gaming program.

Although a variety of card gaming programs may be utilized in accordance with the present invention, in one presently preferred embodiment CPU 126 is configured to execute a blackjack game wherein the gaming program generates a "dealer's" blackjack hand on monitor 138 that is visible to the players at the player stations. The players submit wagers, accept or reject card "hits," and select game options via the keys at the player stations. The player's hands are displayed on monitor 138 along with the dealer's hand in a manner similar to the display of cards on a casino blackjack table. Various versions of the basic blackjack or "21" game are known and may be employed in accordance with the present invention.

Various types of metering devices may be employed within the system. For example, an "in" meter may be used co count the amount of money put into the gaming machine. The construction of such meters, which should be well understood in the industry, need not be described herein. Typically, however, the meter is a relatively simple counter which is incremented by pulses The in meter may be implemented within a system of meters 101 as shown in FIG. 4. Thus, one or more such meters may communicate with common bus 80 directly or through gate array 82.

In operation, the game computer may receive data from a player station's bill acceptor 20 corresponding to an amount of currency accepted. The game program recognizes this amount and causes the game computer or processor 84 to output an appropriate number of pulses to the in meter so that the in meter properly increments, thereby recording the amount of money input at the player station. The number of pulses sent to the meter depends upon the denomination by which the meter is to count. For example, if the machine accepts currency in dollar, or greater, increments, the meter may increment for each dollar input at the machine or player station. Thus, if a player inputs a five dollar bill, the meter is incremented five times.

By controlling the meter through the game program, various types of bill acceptors may be used, for example those which output data by pulses or by digitally formatted signals. Various types of currency may be accepted, for example paper, coins or electronic media.

Other such meters may be attached within the system in a similar fashion for other purposes. For example, the game program may increment an "out" meter to record the amount of money cashed out at the machine or player station, for example through a coin or bill hopper, ticket dispenser or electronic output mechanism. The program may also increment a "credits played" meter, to record how much money is wagered at a player station, and a "credits won" meter, to record if the amount of money returned to the player station as winnings. Additionally, switches may be provided at certain game doors, as described above, so that the game computer is notified of openings and/or closings. Upon notice of a door or drawer opening, the game computer may increment a meter installed for this purpose. Such an arrangement may serve a security purpose, since the game's owner or operator may monitor the meter to assure that the game has not been opened since the previous meter reading. It should therefore be apparent that various game "events" may be metered using the arrangement and construction of the present invention.

The meters may be employed in a variety of game configurations. For example, as described above, they may be used in conjunction with an interface assembly as described herein that facilitates communication between player stations and a workstation running the game. They may also be used, however, in arrangements without such an interface assembly, such as embedded systems or networked player stations not employing a common interface. In an embedded system, the meters can communicate with a dedicated processor on a printed circuit board directly, for example through direct wiring to the circuit board, or indirectly, for example through processors at the player stations. The dedicated processor can increment the meters appropriately as events, such as money in, money out, money wagered, money won and door openings or closings, occur. In the networked arrangement, the meters may be incremented by a server, either directly or through the player stations, or by player station processors.

As noted above, one or more meters may be employed to record data for each player station.

Alternatively, in a multi-player game, a group of meters may be used to record such data for the multiplayer game as a whole, rather than per player station. Such meters may be attached as peripheral devices to the concentrator board 40 (FIG. 5) or to one of the player stations. Furthermore, meter groups, whether for use with the gaming machine as a whole or with individual player station, may be placed on their own boards. Such a board may include, for example, a memory device, a microprocessor and, possibly, an FPGA. Its construction and operation would be similar to that of the player station 16 arrangement illustrated in FIG. 4, but on a smaller scare. In a star arrangement, such a board could communicate with an interface processing system 48 by a serial port 42 (FIG. 3). In a daisy-chain arrangement, the meter board, or boards, may be linked with the player stations.

Moreover, the player stations themselves may be constructed by multiple such boards, each containing a certain group of input and/or output devices. Thus, a player station may have a board for its meters and a separate board for its buttons. In this manner, defective components may be replaced without requiring replacement of the entire player station hardware.

Further, a cabinet may be more easily reconfigured to play a different game which might require a different configuration of certain player station devices.

Moreover, it should be recognized that the hardware arrangements illustrated in the figures are for illustrative purposes only and are not intended to limit the present invention. For example, the gate arrays on the player stations and the concentrator board could be replaced with other appropriate circuitry. Accordingly, it should be understood that any suitable design is within the scope and spirit of the present invention.

Figure 9:
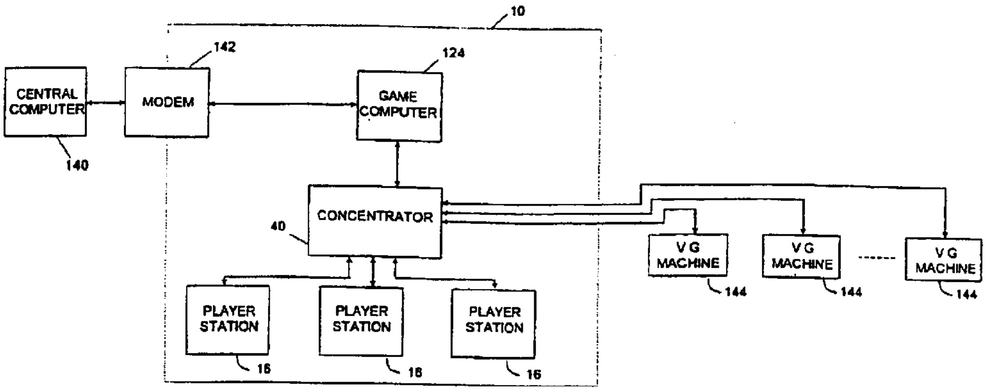
FIG. 9 is a schematic illustration of an embodiment of a video gaming system is accordance with the present invention.

FIG. 9 illustrates a system in which video gaming machines may communicate with a central computer without a location controller. In FIG. 9, a multi-player video gaming machine 10 includes a game computer 124 (for example a personal computer) communicating with three player stations 16 through a concentrator board 40 in a star configuration. As noted above, game computer 124 receives information from, and outputs information to, each player station 16. Thus, game computer 124 is able to calculate all metering data associated with each individual player station. Game computer 124 communicates this information to a central computer 140 through a modem 142 or, for example, a direct wire link from a data port on computer 124. Modem 142 may be an onboard modem within computer 124 or a separate modem with which the computer communicates by a modem card.

In this manner, computer 124 provides security and activity information for each player station 16. For example, messages from computer 124 to central computer 140 may include an address that identifies a given player station so that the central computer can identify the message with that player station and respond accordingly. For example, in systems where a location controller identifies a particular game by the port over which data is received and outputs serial data to the central computer identifying the game, the game computer 124 may be programmed to communicate with the central computer using the same protocol used between the central computer and the location controller. Thus, the present invention may replace a location controller in an existing system without requiring that the central computer be reprogrammed.

The game computer may provide a variety of data to the central computer. For instance, if game computer 124 receives a message from a player station that its money pit door has been opened without authorization, this information may be provided to central computer 140 so that the central computer may take appropriate action directed to that player station. For example, the central computer may direct an operator to the player station and/or instruct game computer over 124 over modem 142 to shut down operation of the player station. In the latter case, the return message from the central computer to game computer 124 includes an address or other code structure identifying the player station to which the instruction applies.

As noted above, game computer 124 receives all metering information, for example money in, money out, credits played and credits won, from player station 16. It is therefore able to communicate this information to central computer 140 through modem 142. If central computer 140 at any time determines that a player station 16 is operating improperly, for example by not maintaining an appropriate return ratio, the central computer may issue a command to game computer 124 to shut down that player station.

Concentrator board 40 may also communicate with single player video gaming machines 144 that would otherwise communicate with central computer 140 through a location controller. These are conventional video gaming machines configured to output serial data to a location controller. In this embodiment, however, the data line from each game 144 is directed to a serial port 42 (FIG. 3) of concentrator board 40. As should be understood in this art, information directed to the location controller is provided in a standard protocol. Thus, the concentrator board processor is programmed to read such signals and to output signals to game computer 124 that include the information carried by the signals from the single player games and that identify the particular games 144 from which the information was received. If the single player games are not adapted to provide an identifying address or code in their output signals, the concentrator board processor may be programmed to add this information, identifying a game 144 by the particular serial port from which a signal was received. Game computer 124 may be programmed to output all signals, whether pertaining to player stations 16 or single player games 144, in a format in which central computer 140 would expect to receive information from a location controller.

Central computer 140 may also issue instructions to shut down a game 144 that is not operating properly. Game computer 124 receives this instruction and outputs an appropriate signal to the concentrator board in response. The concentrator board processor then directs an appropriate instruction, for example in a format in which the game 144 would expect to receive such an instruction from a location controller, to the serial port corresponding to the appropriate game. Game computer 124 identifies the appropriate game 144 in its message co the concentrator board processor.

The system may also be effected in a daisy-chain arrangement. One such arrangement is illustrated in 10 FIG. 10, in which game computer 124 communicates with a first player station 16 which tandemly communicates with two downstream player stations. As discussed above with respect to FIG. 4, the first player station communicates with game computer 124 and the subsequent player station 16 through its serial ports 34 and 95, and the second player station 16 communicates with the upstream and downstream player stations through its serial ports 34 and 95. The final player station 16 communicates with its upstream player station and a concentrator board 40 through its ports 34 and 95.

The concentrator board 40 may be constructed as illustrated in FIG. 3, except that the keyboard port 54 is not used. Specifically, concentrator board 40 communicates with the upstream player station 16 and each of the single player games 144 through respective serial ports 42. When the concentrator board processor receives information from a particular game 144, it identifies the game (either by data included in the message or by the identity of the particular serial port from which the information was received) and outputs a message to the upstream player station 16 that identifies the nature of the message (i.e., that it is intended for the game computer 124 rather than one of the player stations), the identity of the game 144, and the message information. As discussed above with respect to daisy-chain configurations, the upstream player stations pass the message on to game computer 124 that, in turn, outputs an appropriate message carrying the information to central computer 140. Central computer 140 may communicate with player stations 16 and single player games 144 through game computer 124, which directs messages down the chain to a particular player station as discussed above or to concentrator board 40 for output to the serial port 42 (FIG. 3) corresponding to the particular game 144.

As noted above, concentrator board 40 is able to operate player station components. Thus, rather than adding an additional board, concentrator board 40 may be used in place of the last player station 16 in FIG. 10 while also directing message traffic to and from the games 144.

Figure 10:
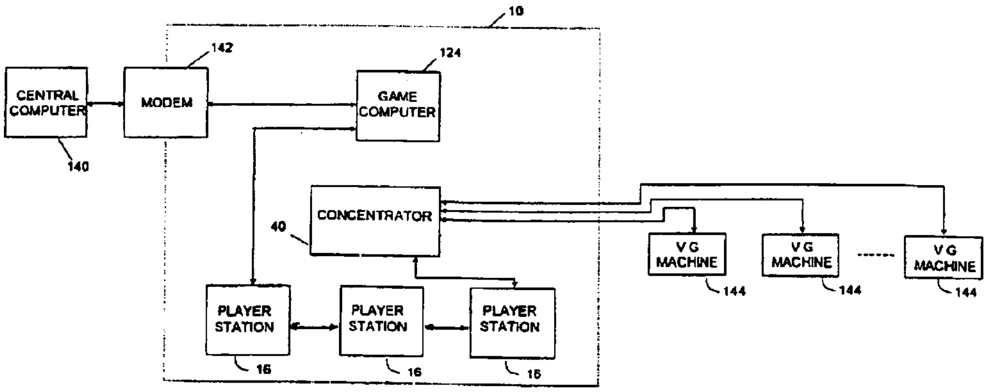
FIG. 10 is a schematic illustration of an embodiment of a video gaming system in accordance with the present invention.

As an alternative to the concentrator board arrangement illustrated in FIG. 10, each game 144 may be retrofit with a board having a processor, at least three serial ports and appropriate memory, for example using such components as described above regarding the player station board illustrated in FIG. 4. It should be understood, however, that the game boards may employ any suitable circuitry, for example replacing the processor with suitable logic circuits.

Figure 11:
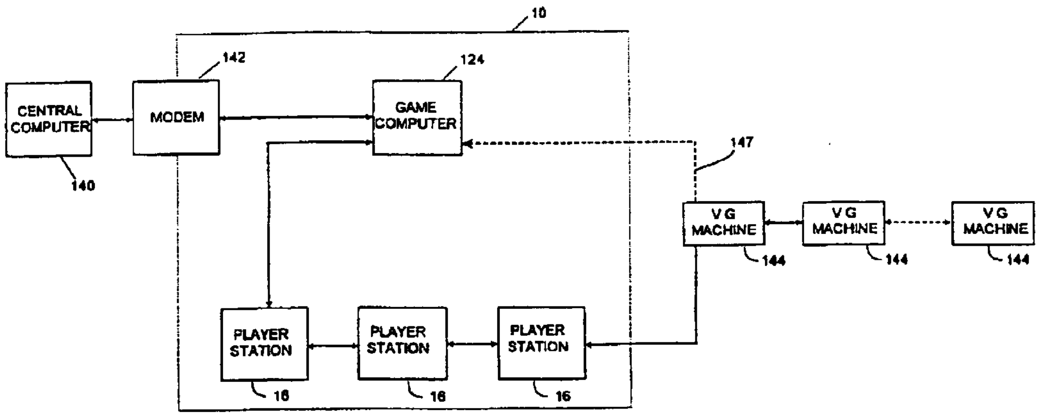
FIG. 11 is a schematic illustration of an embodiment of a video gaming system in accordance with the present invention.

The first game board serial port is used to communicate between the board and the game 144. This function may require an additional serial port, one for input and one for output, depending on the game's configuration. The other two serial ports perform the "up" and "down" functions as described above with respect to daisy-chained player stations. That is, one serial port is used to communicate with downstream devices while the other is used to communicate with upstream devices. Thus, a message intended for a particular game 144 may be output from the last player station to subsequent game boards until the message reaches the board on the correct game. The message includes an address identifying the game so that it is recognized by the game board's processor, which then outputs an appropriate message to the game through the first serial port. Messages from the game 144 to the central computer are output through the game board first serial port and are directed by the game board processer to the game board up port for output to upstream game boards and player stations to the game computer 124, which then communicates with central computer 140. Tandemly linked player stations retrofit with such boards are schematically shown in FIG. 11. In an alternate arrangement, the upstreammost game 144 may output directly to a data port of game computer 124, as shown by a dotted line 147.

Figure 12:
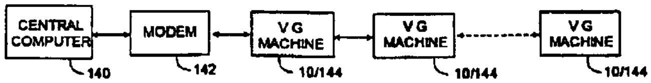
FIG. 12 is a schematic illustration of an embodiment of a video gaming system in accordance with the present invention.

As noted above, a single player video gaming machine may be constructed using a game computer and a single player station 16 or concentrator board 40 as discussed above with respect to FIGS. 4 and 5. In this case, any number of single player or multiplayer games may be daisy-chained together as shown in FIG. 12. The game computer of each downstream game communicates with its adjacent upstream game by a data port on the upstream game's game computer or by a player station serial port. The game computer of the upstreammost game communicates with central computer 140 through a modem 142 or through a direct line connection from a data port of the game computer. Where enough serial ports are provided on the player stations, all upstream and downstream communications may be effected through player station serial ports.

Figure 13:
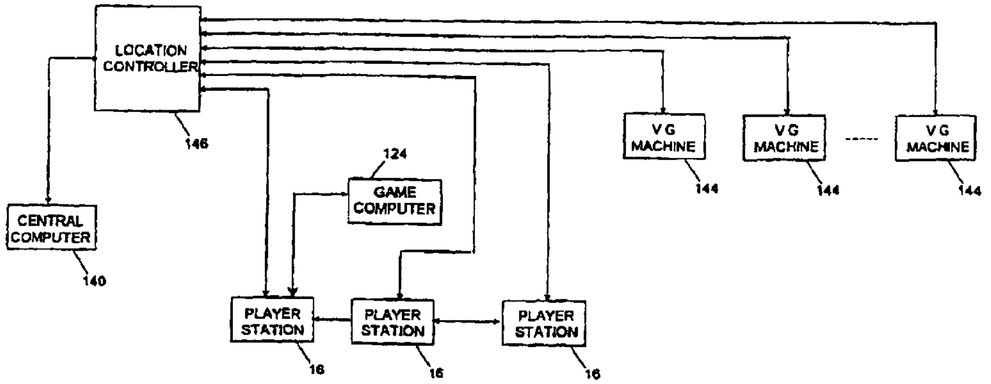
FIG. 13 is a schematic illustration of an embodiment of a video gaming system in accordance with the present invention.

Moreover, it should be understood that various suitable configurations are possible. For example, a game computer having USB technology can communicate with up to 127 serial devices on each USB port. Thus, a game computer having one or more USB ports could perform the function of concentrator board 40 in FIG. 10. It should be understood that all suitable arrangements and component configurations are included within the scope and spirit of the present invention. Multiplayer video gaming devices in accordance with the present invention may be employed in existing systems having location controllers. Referring to FIG. 13, a multi-player game 10 includes a game computer 124 and three player stations 16 arranged in a daisy-chain configuration as discussed above. Referring also to FIG. 4, each player station has four serial ports. Two of the serial ports 34 and 95 function as the up and down ports. One of the other ports 85 and 93, however, communicates with a location controller 146. Player station processor 84 is configured, in conjunction with game computer 124, to output information corresponding to each particular player station in the same output format as games 144.

Thus, central computer 140 and location controller 146 are able to treat each player station 16 as if it were a separate game.

Instructions directed from the central computer to a player station through the location controller are detected by the player station processor 84. Thus, processor 84 and/or game computer 124 is able to shut down the operation of a given player station 16 responsively to central computer 140 without affecting the operation of the other player stations.

Figure 14:
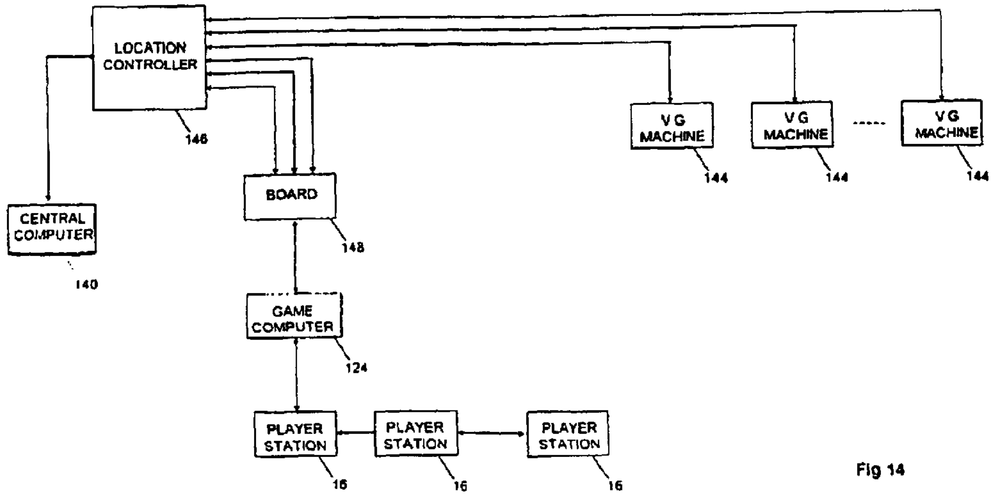
FIG. 14 is a schematic illustration of an embodiment of a video gaming system in accordance with the present invention, Repeat use of reference characters in the present specification and drawings is intended to represent same or analogous features or elements of the invention.

An alternate embodiment is provided in FIG. 14. Here, player stations 16 are disposed in a daisy-chain arrangement with respect to game computer 124. Rather than communicating directly with each player station, however, location controller 146 receives player station information from a board 148. Board 148 may include a processor, at least four serial ports and appropriate memory as described with regard to such components illustrated in FIG. 4. It should be understood, however, that board 148 may employ any suitable circuitry, for example replacing the processor with suitable logic circuits.

Game computer 124 accumulates information associated with each player station and outputs messages specific to a given player station to one of the serial ports on board 148. The board 148 processor receives these messages and directs an appropriate message to a particular serial port corresponding to a particular player station 16. The game computer and/or the board 148 processor may configure the messages so that they are output at these serial ports in a format compatible with local controller 146. Thus, local controller 146 sees three separate inputs corresponding to three separate player stations, permitting these player stations to be treated by central computer 140 as separate game machines.

The processor of board 148 is programmed to receive instructions from central computer 140 and to output an appropriate message identifying the intended player station 16 to game computer 124 so that game computer 124 may take appropriate actions with respect to that player station. Where the configuration of central computer 140 and location controller 146 permit, board 148 may be omitted so that game computer 124 may communicate with the central computer through the location controller over a single serial data line. Alternatively, location controller 146 may communicate with game computer 124 over three serial lines where game computer 124 includes sufficient serial ports. It should also be understood that the player stations of FIGS. 13 and 14 may be arranged in a star configuration.

While preferred embodiments of the invention have been described above, it should be understood that any and all equivalent realizations of the present invention are included within the scope and spirit thereof. The embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention.

What is claimed is:

1. A multi-player card gaming system comprising:

a) a plurality of spatially separate player stations, each said player station including:
   - at least one input device for allowing a player to enter game play selections into said system;
   - a currency acceptor for entering currency to facilitate game play;
   - a money pit door for gaming access to a money pit for collecting currency from said currency acceptor;
   - at least one output device for communicating game play outcome to the player, and
   - means for monitoring a plurality of events at said player station, said events at least including opening of said money pit door and entering an amount of currency into said currency acceptor;

b) a game processor interfaced to said plurality of player stations;

c) a single video display monitor connected to said game processor for displaying said game play of each player station together, and d) a remote computer interfaced to said game processor for monitoring events of multiple individual gaming machines;

wherein, said game processor is programmed first to execute a multi-player video card gaming program in response to inputs received from said player station input devices and currency acceptors, determine an outcome of said gaming program for each said player station, display said outcome on said video display monitor and communicate said outcome to said player station output devices; and second, to receive player station event information from said event monitoring means in each said player station and, in response thereto, to send messages to said remote computer, each said message identifying a one of said player stations and an event at said one of said player stations; and, in response to receipt of a command from said remote computer to shut down one of said player stations, sending a shut down command to said one of said player stations; and, said remote computer is programmed to identify each of said player stations as a corresponding one of a plurality of separate gaming machines and, in response to receipt of a message from said game processor indicating improper operation of one of said player stations, sending a command to said game processor to shut down said one of said gaming machines, said command including information identifying which of said gaming machines is to be shut down.

2. The system of claim 1, wherein said remote computer is programmed, in response to receipt of a message from said gaming program that the money pit door of one of said player stations has been opened, to send a command to said game processor identifying said one of said player stations and commanding said game processor to shut down that one of said player stations.

3. The system of claim 1, wherein said game processor is implemented using a personal computer.

4. The system of claim 3, wherein each player station further includes a player station processor for generating personal computer compatible codes in response to actuation of said input devices or said currency acceptor, and inputting said codes into said game processor.

5. The system of claim 1, further including metering means for metering game play activity data as a whole for said multiplayer game and wherein said game processor further is programmed to send said game play activity data to said remote computer.

6. A multi-player card gaming system comprising:

a) a plurality of spatially separate player stations, each said player station including:

at least one input device for allowing a player to enter game play selections into said system;

a currency acceptor for entering currency to facilitate game play;

a money pit door for gaining access to a money pit for collecting currency from said currency acceptor;

at least one output device for communicating game play outcome to the player;

means for monitoring a plurality of events at said player station, said events at least including opening of said money pit door and entering an amount of currency into said currency acceptor; and a player station processor for generating personal computer compatible codes in response to actuation of said input devices or said currency acceptor, or occurrence of any of said player station events;

b) a game processor interfaced to said plurality of player stations and receiving said codes from each of said player station processors, said game processor being implemented by a personal computer;

c) a single video display monitor interfaced to said game processor for displaying said game play of each player station together;

d) a remote computer interfaced to said game processor for monitoring events of multiple individual gaming machines; and e) metering means for metering game play activity data as a whole for said multiplayer game;

wherein, said game processor is programmed first to execute a multiplayer video card gaming program in response to inputs received from said player station input devices and currency acceptors, determine an outcome of said gaming program for each said player station, display said outcome on said video display monitor and communicate said outcome to said player station output devices; and second, to receive player station event information from said event monitoring means in each said player station and said game play activity data as a whole from said metering means and, in response thereto, send messages to said remote computer, each said message identifying either said game play activity data as a whole or a one of said player stations and an event at said one of said player stations; and, in response to receipt of a command from said remote computer to shut down one of said player stations, sending a shut down command to said one of said player stations; and, said remote computer is programmed to identify each of said player stations as a corresponding one of a plurality of separate gaming machines and in response to receipt of a message from said game processor indicating that the money pit door of one of said player stations has been opened, sending a command to said game processor to shut down said one of said player station,said command including information identifying which of said player stations is to be shut down.

* * * * *

US006921337C1

(12) EX PARTE REEXAMINATION CERTIFICATE (8713th)

United States Patent

Kennedy et al.

(10) Number: US 6,921,337 C1

(45) Certificate Issued: Nov. 29, 2011

(54) VIDEO GAMING DEVICE AND COMMUNICATIONS SYSTEM

(75) Inventors: Julian J. Kennedy, North Myrtle Beach, NC (US); Michael A. Morris, Hunstville, AL (US); Douglas E. Morris, Huntsville, AL (US)

(73) Assignee: Vegas Amusement, Inc., Central, SC (US)

Reexamination Request:
No. 90/011,075, Jun. 30, 2010

Reexamination Certificate for:

| | |
|---|---|
| Patent No.: | **6,921,337** |
| Issued: | **Jul. 26, 2005** |
| Appl. No.: | **09/787,103** |
| Filed: | **Jul. 25, 2001** |

(22) PCT Filed: Sep. 14, 1999

(86) PCT No.: PCT/ZA99/00085

§ 371 (c)(1),
(2), (4) Date: Jun. 7, 2001

(87) PCT Pub. No.: WO00/16273

PCT Pub. Date: Mar. 23, 2000

Related U.S. Application Data

(60) Provisional application No. 60/100,449, filed on Sep. 14, 1998.

(51) Int. Cl.
*A63F 13/00* (2006.01)

(52) U.S. Cl. ............................... 463/42; 463/12; 463/13

(58) Field of Classification Search ........................ None
See application file for complete search history.

(56) References Cited

To view the complete listing of prior art documents cited during the proceeding for Reexamination Control Number 90/011,075, please refer to the USPTO's public Patent Application Information Retrieval (PAIR) system under the Display References tab.

*Primary Examiner*—John M Hotaling, II

(57) ABSTRACT

A video gaming device which includes a game computer which is connected to a central computer and a plurality of player stations connected to the game computer. Connection of the player stations may be effected using an interface device which includes at least one serial port which has a transmit line for transmitting data to a player station and a receive line for receiving data from a player station, input port means and output port means for communication with the game computer, and processing means for routing data between the said serial port and the input and output port means.

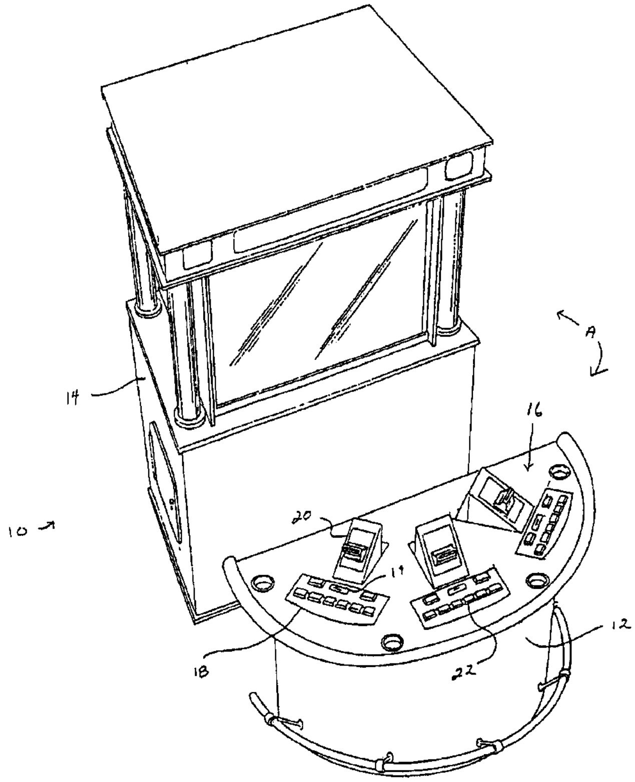

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6 are determined to be patentable as amended.

1. A multi-player card gaming system comprising:

a) a plurality of spatially separate player stations, each said player station including:
  at least one input device for allowing a player to enter game play selections into said system;
  a currency acceptor for entering currency to facilitate game play;
  a money pit door for gaming access to a money pit for collecting currency from said currency acceptor;
  at least one output device for communicating game play outcome to the player, and
  means for monitoring a plurality of events at said player station, said events at least including opening of said money pit door and entering an amount of currency into said currency acceptor;

b) a *single* game processor interfaced to said plurality of player stations;

c) a single video display monitor connected to said *single* game processor for displaying said game play of each player station together, and d) a remote computer interfaced to said *single* game processor for monitoring events of multiple individual gaming machines;

wherein, said *single* game processor is programmed first to execute a multi-player video card gaming program in response to inputs received from *an interface device in operative communication with* said player station input devices and currency acceptors, *said interface device configured to receive inputs from said player station input devices and said currency acceptors and to output interface signals corresponding to particular said player station input devices and said currency acceptors to said single game processor,* determine an outcome of said gaming program for each said player station, display said outcome on said video display monitor and communicate said outcome to said player station output devices; and second, to receive player station event information from said event monitoring means in each said player station and, in response thereto, to send messages to said remote computer, each said message identifying a one of said player stations and an event at said one of said player stations; and, in response to receipt of a command from said remote computer to shut down one of said player stations, sending a shut down command to said one of said player stations; and, said remote computer is programmed to identify each of said player stations as a corresponding one of a plurality of separate gaming machines and, in response to receipt of a message from said *single* game processor indicating improper operation of one of said player stations, sending a command to said *single* game processor to shut down said one of said gaming machines, said command including information identifying which of said gaming machines is to be shut down.

2. The system of claim 1, wherein said remote computer is programmed, in response to receipt of a message from said gaming program that the money pit door of one of said player stations has been opened, to send a command to said *single* game processor identifying said one of said player stations and commanding said *single* game processor to shut down that one of said player stations.

3. The system of claim 1, wherein said *single* game processor is implemented using a personal computer.

4. The system of claim 3, wherein each player station further includes a player station processor for generating personal computer compatible codes in response to actuation of said input devices or said currency acceptor, and inputting said codes into said *single* game processor.

5. The system of claim 1, further including metering means for metering game play activity data as a whole for said multiplayer game and wherein said *single* game processor further is programmed to send said game play activity data to said remote computer.

6. A multi-player card gaming system comprising:

a) a plurality of spatially separate player stations, each said player station including:
  at least one input device for allowing a player to enter game play selections into said system;
  a currency acceptor for entering currency to facilitate game play;
  a money pit door for gaining access to a money pit for collecting currency from said currency acceptor;
  at least one output device for communicating game play outcome to the player;
  meansfor monitoring a plurality of events at said player station, said events at least including opening of said money pit door and entering an amount of currency into said currency acceptor; and
  a player station processor for generating personal compatible codes in response to actuation of said input devices or said currency acceptor, or occurrence of any of said player station events;

b) a *single* game processor interfaced to said plurality of player stations and receiving said codes from each of said player station processors, said *single* game processor being implemented by a personal computer;

c) a single video display monitor interfaced to said *single* game processor for displaying said game play of each player station together;

d) a remote computer interfaced to said *single* game processor for monitoring events of multiple individual gaming machines; and e) metering means for metering game play activity data as a whole for said multiplayer game;

wherein, said *single* game processor is programmed first to execute a multiplayer video card gaming program in response to inputs received from *an interface device in operative communication with* said player station input devices and currency acceptors, *said interface device configured to receive inputs from said player station input devices and said currency acceptors and to output interface signals corresponding to particular said player station input devices and said currency acceptors to said single game processor,* determine an outcome of said gaming program for each said player station, display said outcome on said video display monitor, and communicate said outcome to said player station output devices; and second, to receive player station event information from said event monitoring means in each said player station and said game play activity data as a whole from said metering means and, in response thereto, send messages to said remote computer, each said message identifying either said game play activity data as a whole or a one of said player stations and an event at said one of said player stations; and, in response to receipt of a command from said remote computer to shut down one of said player stations, sending a shut down command to said one of said player stations; and, said remote computer is programmed to identify each of said player stations as a corresponding one of a plurality of separate gaming machines and in response to receipt of a message from said *single* game processor indicating that the money pit door of one of said player stations has been opened, sending a command to said *single* game processor to shut down said one of said player station, said command including information identifying which of said player stations is to be shut down.

* * * * *

US006921337C2

(12) EX PARTE REEXAMINATION CERTIFICATE (9714th)

United States Patent

Kennedy et al.

(10) Number: US 6,921,337 C2

(45) Certificate Issued: Jun. 25, 2013

(54) VIDEO GAMING DEVICE AND COMMUNICATIONS SYSTEM

(75) Inventors: Julian J. Kennedy, North Myrtle Beach, NC (US); Michael A. Morris, Huntsville, AL (US); Douglas E. Morris, Huntsville, AL (US)

(73) Assignee: Vegas Amusement, Inc., Central, SC (US)

Reexamination Request:

No. 90/012,240, Apr. 5, 2012

Reexamination Certificate for:

| | |
|---|---|
| Patent No.: | **6,921,337** |
| Issued: | **Jul. 26, 2005** |
| Appl. No.: | **09/787,103** |
| Filed: | **Jun. 7, 2001** |

Reexamination Certificate C1 6,921,337 issued Nov. 29, 2011

(21) Appl. No.: 90/012,240

(22) PCT Filed: Sep. 14, 1999

(86) PCT No.: PCT/ZA99/00085

§ 371 (c)(1), (2), (4) Date: Jun. 7, 2001

(87) PCT Pub. No.: WO00/16273

PCT Pub. Date: Mar. 23, 2000

Related U.S. Application Data

(60) Provisional application No. 60/100,449, filed on Sep. 14, 1998.

(51) Int. Cl.

*A63F 13/00* (2006.01)

(52) U.S. Cl.

USPC .................. 463/42; 463/40; 463/41; 463/28; 463/29

(58) Field of Classification Search

None

See application file for complete search history.

(56) References Cited

To view the complete listing of prior art documents cited during the proceeding for Reexamination Control Number 90/012,240, please refer to the USPTO's public Patent Application Information Retrieval (PAIR) system under the Display References tab.

*Primary Examiner* — Cameron Saadat

(57) ABSTRACT

A video gaming device which includes a game computer which is connected to a central computer and a plurality of player stations connected to the game computer. Connection of the player stations may be effected using an interface device which includes at least one serial port which has a transmit line for transmitting data to a player station and a receive line for receiving data from a player station, input port means and output port means for communication with the game computer, and processing means for routing data between the said serial port and the input and output port means.

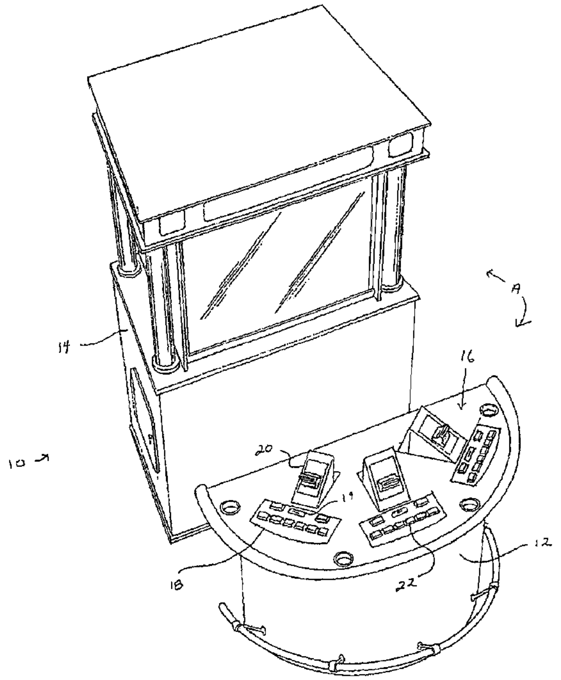

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *